United States Patent
Maloney et al.

(10) Patent No.: US 9,824,291 B2
(45) Date of Patent: Nov. 21, 2017

(54) IMAGE ANALYSIS BASED COLOR SUGGESTIONS

(71) Applicant: Microsoft Technology Licensing, LLC., Redmond, WA (US)

(72) Inventors: Christopher Michael Maloney, San Francisco, CA (US); Gilberto Aristides Apodaca Aragon, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/081,416

(22) Filed: Mar. 25, 2016

(65) Prior Publication Data

US 2017/0140241 A1    May 18, 2017

Related U.S. Application Data

(60) Provisional application No. 62/255,182, filed on Nov. 13, 2015.

(51) Int. Cl.
| | | |
|---|---|---|
| *G06K 9/46* | (2006.01) | |
| *G06T 7/00* | (2017.01) | |
| *G06K 9/00* | (2006.01) | |

(52) U.S. Cl.
CPC ....... *G06K 9/4652* (2013.01); *G06K 9/00234* (2013.01); *G06T 7/0081* (2013.01); *G06T 2207/20141* (2013.01)

(58) Field of Classification Search
USPC ........................................................ 382/164
See application file for complete search history.

(56) References Cited

U.S. PATENT DOCUMENTS

| | | |
|---|---|---|
| 5,499,366 A | 3/1996 | Rosenberg et al. |
| 5,909,689 A | 6/1999 | Ryzin |
| 6,035,323 A | 3/2000 | Narayen et al. |
| 6,081,262 A | 6/2000 | Gill et al. |
| 6,983,068 B2 | 1/2006 | Prabhakar et al. |

(Continued)

FOREIGN PATENT DOCUMENTS

| | | |
|---|---|---|
| EP | 1085464 A2 | 3/2001 |
| EP | 1657648 A2 | 5/2006 |

(Continued)

OTHER PUBLICATIONS

About layouts, Retrieved on: Mar. 26, 2013, Available at: http://office.microsoft.com/en-in/powerpoint-help/about-layouts-HP003082915.aspx.

(Continued)

*Primary Examiner* — Jerome Grant, II
(74) *Attorney, Agent, or Firm* — Merchant & Gould P.C.

(57) ABSTRACT

Systems, components, devices, and methods for generating suggestions based on extracting colors from an image are provided. A non-limiting example is a method for generating suggestions for arranging content based on matching colors in an image. The method includes the step of receiving a content file. The content file includes a content region and an image. The method also includes the step of analyzing the image to identify candidate colors in the image. Additionally, the method includes the step of generating a suggestion for the content region. The suggestion includes the image and a suggested design element. The suggested design element matches one of the identified candidate colors.

16 Claims, 14 Drawing Sheets

(56) References Cited

U.S. PATENT DOCUMENTS

| | | | |
|---|---|---|---|
| 7,039,229 | B2 | 5/2006 | Lin et al. |
| 7,171,042 | B2 | 1/2007 | Hartmann et al. |
| 7,194,134 | B2 | 3/2007 | Bradshaw |
| 7,386,791 | B2 | 6/2008 | Jacobson |
| 7,500,194 | B2 | 3/2009 | Collins et al. |
| 7,577,905 | B2 | 8/2009 | Collins et al. |
| 7,716,332 | B1 | 5/2010 | Topfl |
| 7,860,305 | B2 | 12/2010 | Wang et al. |
| 8,024,658 | B1 | 9/2011 | Fagans et al. |
| 8,214,742 | B2 | 7/2012 | Pratt |
| 8,416,255 | B1 | 4/2013 | Gilra |
| 8,418,059 | B2 | 4/2013 | Kitada |
| 8,560,952 | B2 | 10/2013 | Collins et al. |
| 8,745,158 | B2 | 6/2014 | Claman |
| 8,775,918 | B2 | 7/2014 | Livshin et al. |
| 8,799,829 | B2 | 8/2014 | Grosz et al. |
| 8,890,886 | B2 | 11/2014 | Kriese et al. |
| 9,177,225 | B1* | 11/2015 | Cordova-Diba .......... G06T 5/00 |
| 2002/0102018 | A1 | 8/2002 | Lin et al. |
| 2002/0186236 | A1 | 12/2002 | Brown et al. |
| 2002/0194227 | A1 | 12/2002 | Day et al. |
| 2004/0001106 | A1 | 1/2004 | Deutscher et al. |
| 2004/0034829 | A1 | 2/2004 | Ohashi et al. |
| 2004/0243930 | A1 | 12/2004 | Schowtka et al. |
| 2005/0100223 | A1 | 5/2005 | de Queiroz |
| 2005/0108619 | A1 | 5/2005 | Theall et al. |
| 2005/0171758 | A1 | 8/2005 | Palmquist |
| 2006/0036965 | A1 | 2/2006 | Harris et al. |
| 2006/0126932 | A1 | 6/2006 | Eschbach |
| 2006/0136827 | A1 | 6/2006 | Villaron et al. |
| 2006/0156218 | A1 | 7/2006 | Lee |
| 2006/0220983 | A1 | 10/2006 | Isomura et al. |
| 2006/0259858 | A1 | 11/2006 | Collins et al. |
| 2006/0282779 | A1 | 12/2006 | Collins et al. |
| 2006/0294046 | A1 | 12/2006 | Sareen et al. |
| 2007/0019924 | A1 | 1/2007 | Teo et al. |
| 2007/0196013 | A1 | 8/2007 | Li et al. |
| 2007/0198523 | A1 | 8/2007 | Hayim |
| 2007/0291049 | A1 | 12/2007 | Edwards et al. |
| 2008/0075360 | A1 | 3/2008 | Li et al. |
| 2008/0276176 | A1 | 11/2008 | Wahba et al. |
| 2009/0049064 | A1 | 2/2009 | Alquier et al. |
| 2009/0051826 | A1 | 2/2009 | Chang |
| 2009/0077261 | A1 | 3/2009 | Broadhurst et al. |
| 2009/0116752 | A1 | 5/2009 | Isomura et al. |
| 2009/0252413 | A1 | 10/2009 | Hua et al. |
| 2010/0088605 | A1 | 4/2010 | Livshin et al. |
| 2010/0092076 | A1* | 4/2010 | Iofis ........................ G06F 21/36 382/162 |
| 2010/0158380 | A1 | 6/2010 | Neville et al. |
| 2010/0289818 | A1 | 11/2010 | Hirooka |
| 2011/0058736 | A1* | 3/2011 | Tokunaga ............... G06T 11/00 382/165 |
| 2011/0125722 | A1 | 5/2011 | Rae et al. |
| 2011/0157221 | A1 | 6/2011 | Ptucha et al. |
| 2011/0221764 | A1 | 9/2011 | Callens et al. |
| 2011/0234613 | A1 | 9/2011 | Hanson |
| 2011/0243453 | A1 | 10/2011 | Kashima et al. |
| 2011/0280476 | A1 | 11/2011 | Berger et al. |
| 2012/0105467 | A1 | 5/2012 | Chao et al. |
| 2012/0106859 | A1 | 5/2012 | Cheatle |
| 2012/0275704 | A1 | 11/2012 | Cok et al. |
| 2013/0028521 | A1 | 1/2013 | Yabu |
| 2013/0111373 | A1 | 5/2013 | Kawanishi et al. |
| 2013/0124980 | A1 | 5/2013 | Hudson et al. |
| 2013/0239002 | A1 | 9/2013 | Maloney et al. |
| 2014/0282009 | A1 | 9/2014 | Avrahami |
| 2014/0380171 | A1 | 12/2014 | Maloney et al. |
| 2015/0046791 | A1 | 2/2015 | Isaacson |
| 2015/0095385 | A1 | 4/2015 | Mensch et al. |
| 2015/0113411 | A1 | 4/2015 | Underwood et al. |
| 2015/0277726 | A1 | 10/2015 | Maloney et al. |
| 2015/0310124 | A1 | 10/2015 | Ben-Aharon et al. |
| 2016/0171954 | A1* | 6/2016 | Guo ........................ G09G 5/02 345/589 |
| 2017/0026552 | A1* | 1/2017 | Tomono ................ H04N 1/628 |
| 2017/0139930 | A1 | 5/2017 | Maloney |
| 2017/0139978 | A1 | 5/2017 | Hayworth et al. |
| 2017/0140250 | A1 | 5/2017 | Maloney et al. |

FOREIGN PATENT DOCUMENTS

| | | |
|---|---|---|
| EP | 2503759 A1 | 9/2012 |
| EP | 3119062 A1 | 1/2017 |
| WO | 9519003 | 7/1995 |
| WO | 0193563 A2 | 12/2001 |
| WO | 2006126628 A1 | 11/2006 |
| WO | 2009085526 A1 | 7/2009 |
| WO | 2012047253 A3 | 4/2012 |
| WO | 2013059545 A1 | 4/2013 |
| WO | 2014015081 A2 | 1/2014 |
| WO | 2014131194 A1 | 9/2014 |

OTHER PUBLICATIONS

Leading the way in Microsoft Office Development, Retrieved on: Mar. 26, 2013, Available at: http://www.bettersolutions.com/powerpoint/PIZ113/YU112210331.htm.

PCT International Preliminary Report on Patentability Issued in PCT Application No. PCT/US2014/041025, dated Oct. 7, 2015, 8 Pages.

PCT International Search Report dated Nov. 26, 2014 in Application No. PCT/US2014/041025, 9 pgs.

PCT Second Written Opinion Issued in Patent Application No. PCT/US2014/041025, dated Jun. 5, 2015, 7 Pages.

U.S. Appl. No. 11/152,755 Notice of Allowance dated Jun. 8, 2009 8 pgs.

U.S. Appl. No. 11/152,755 Office Action dated Sep. 4, 2008 7 pgs.

U.S. Appl. No. 11/152,755 Response dated Feb. 4, 2009 8 pgs.

U.S. Appl. No. 13/925,114 Office Action dated Mar. 10, 2016 7 pgs.

U.S. Appl. No. 13/925,114 Amendment dated Jul. 11, 2016 12 pgs.

"Create a slide layout that meets your needs", Retrieved on: Oct. 28, 2015, Available at:https://support.office.com/en-us/article/Create-a-slide-layout-that-meets-your-needs-f881f3a5-522b-4ff8-a496-10a74771a14c, 2 pgs.

Abela, "Announcing the Slide Chooser", Published on: Jan. 14, 2015, 4 pgs., available at: http://extremepresentation.typepad.com/blog/2015/01/announcing-the-slide-chooser.html.

Athitsos et al., "Distinguishing Photographs and Graphics on the World Wide Web", In Proceedings of IEEE Workshop on Content-Based Access of Image and Video Libraries, Jun. 20, 1997, pp. 1-7.

Behera et al., "Combing Color and Layout Features for the Identification of Low-resolution Documents", Google, Mar. 2005, 8 pgs.

Chen et al., "Artistic Image Analysis using the Composition of Human Figures", In Proceedings of European Conference on Computer Vision, Sep. 6, 2014, pp. 1-15.

Chen et al., "Identifying Computer Graphics Using HSV Color Model and Statistical Moments of Characteristic Functions", In Proceedings of IEEE International Conference on Multimedia and Expo, Jul. 2, 2007, 4 pgs.

Deng et al., "Color Image Segmentation", In Proceedings of Conference on Computer Vision and Pattern Recognition, vol. 2, Jun. 23, 1999, 6 pgs.

Dogar et al., "Ditto—A System for Opportunistic Caching in Multi-hop Wireless Networks", In Proceedings of the 14th ACM International Conference on Mobile Computing and Networking, Sep. 14, 2008, 12 pgs.

Krinidis et al., "An Unsupervised Image Clustering Method Based on EEMD Image Histogram", In Journal of Information Hiding and Multimedia Signal Processing, vol. 3, No. 2, Apr. 2012, pp. 151-163.

Luo et al., "Natural Scene Classification using Overcomplete ICA", In Journal of Pattern Recognition, vol. 38, No. 10, Oct. 2005, pp. 1507-1519.

Morse et al., "Image-based Color Schemes", In Proceedings of IEEE International Conference on Image Processing, vol. 3, Sep. 16, 2007, pp. 497-500.

(56) References Cited

OTHER PUBLICATIONS

Muthitacharoen et al., "A Low-bandwidth Network File System", In Proceedings of Eighteenth ACM Symposium on Operating Systems Principles, Oct. 21, 2004, 14 pgs.
Ng et al., "Classifying Photographic and Photorealistic Computer Graphic Images using Natural Image Statistics", In Advent Technical Report #220-2006-6, Oct. 2004, pp. 1-20.
Park et al., "Supporting Practical Content-Addressable Caching with CZIP Compression", In Proceedings of USENIX Annual Technical Conference, Jun. 17, 2007, 24 pgs.
Prabhakar et al., "Picture-Graphics Color Image Classification", In Proceedings of International Conference on Image Processing, vol. 2, Sep. 22, 2002, 5 pgs.
Tridgell et al., "The Rsync Algorithm", In Technical Report TR-CS-96-05 of The Australian National Unversity, Jun. 1996, 8 pgs.
PCT International Search Report dated Feb. 1, 2017 cited in Application No. PCT/US2016/060424, 13 pgs.
PCT International Search Report dated Feb. 8, 2017 cited in Application No. PCT/US2016/060498, 11 pgs.
PCT International Search Report and Written Opinion dated Mar. 2, 2017 cited in Application No. PCT/US2016/060414, 13 pgs.
PCT International Search Report and Written Opinion dated Mar. 2, 2017 cited in Application No. PCT/US2016/060416, 23 pgs.
U.S. Final Office Action dated Oct. 12, 2016 cited in U.S. Appl. No. 13/925,114, 18 pgs.
PCT 2nd Written Opinion dated Jul. 31, 2017 cited in Application No. PCT/US2016/060416, 11 pgs.

* cited by examiner

MOBILE COMPUTING DEVICE

IMAGE ANALYSIS BASED COLOR SUGGESTIONS

CROSS-REFERENCE TO RELATED APPLICATIONS

This application claims priority to U.S. Provisional Application Ser. No. 62/255,182, entitled "IMAGE ANALYSIS BASED COLOR SUGGESTIONS," filed on Nov. 13, 2015, the entire disclosure of which is hereby incorporated herein by reference.

BACKGROUND

Presentation editors work with presentation content files, which often include images. Presentation editors typically do not offer a robust method for placing content, such as images, on slides and it is often challenging for users who create presentations to envision alternatives regarding how to effectively organize slide content. Such organization is vital for conveying a message to the presentation viewer, making effective use of the slide space, and making presentations more visually interesting. Organizing content using current presentation editors may be challenging. For example, some presentation editors simply provide a few slide layouts (also referred to as "slide formats") from which to choose and only allow users to add content according to the slide format provided. Thus, reorganizing the slide requires selecting a new slide format and re-adding content. Further, presentation editors often simply overlay new content over the existing slide content, which blocks the existing content and may make it more difficult to fit the new content into the existing slide. Additionally, it may be difficult to match other elements of a slide to content that is added to the slide.

It is with respect to these and other general considerations that aspects have been made. Also, although relatively specific problems have been discussed, it should be understood that the aspects should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the present disclosure provide a system and method for generating suggestions that incorporate colors extracted from an image. A non-limiting example is a method for generating suggestions for arranging content based on matching colors in an image. The method includes the step of receiving a content file. The content file includes a content region and an image. The method also includes the step of analyzing the image to identify candidate colors in the image. Additionally, the method includes the step of generating a suggestion for the content region. The suggestion includes the image and a suggested design element. The suggested design element matches one of the identified candidate colors.

Aspects may be implemented as a computer process, a computing system or as an article of manufacture such as a computer program product or computer readable media. The computer program product may be computer storage media readable by a computer system and encoding a computer program of instructions for executing a computer process.

DETAILED DESCRIPTION

Figure 1:
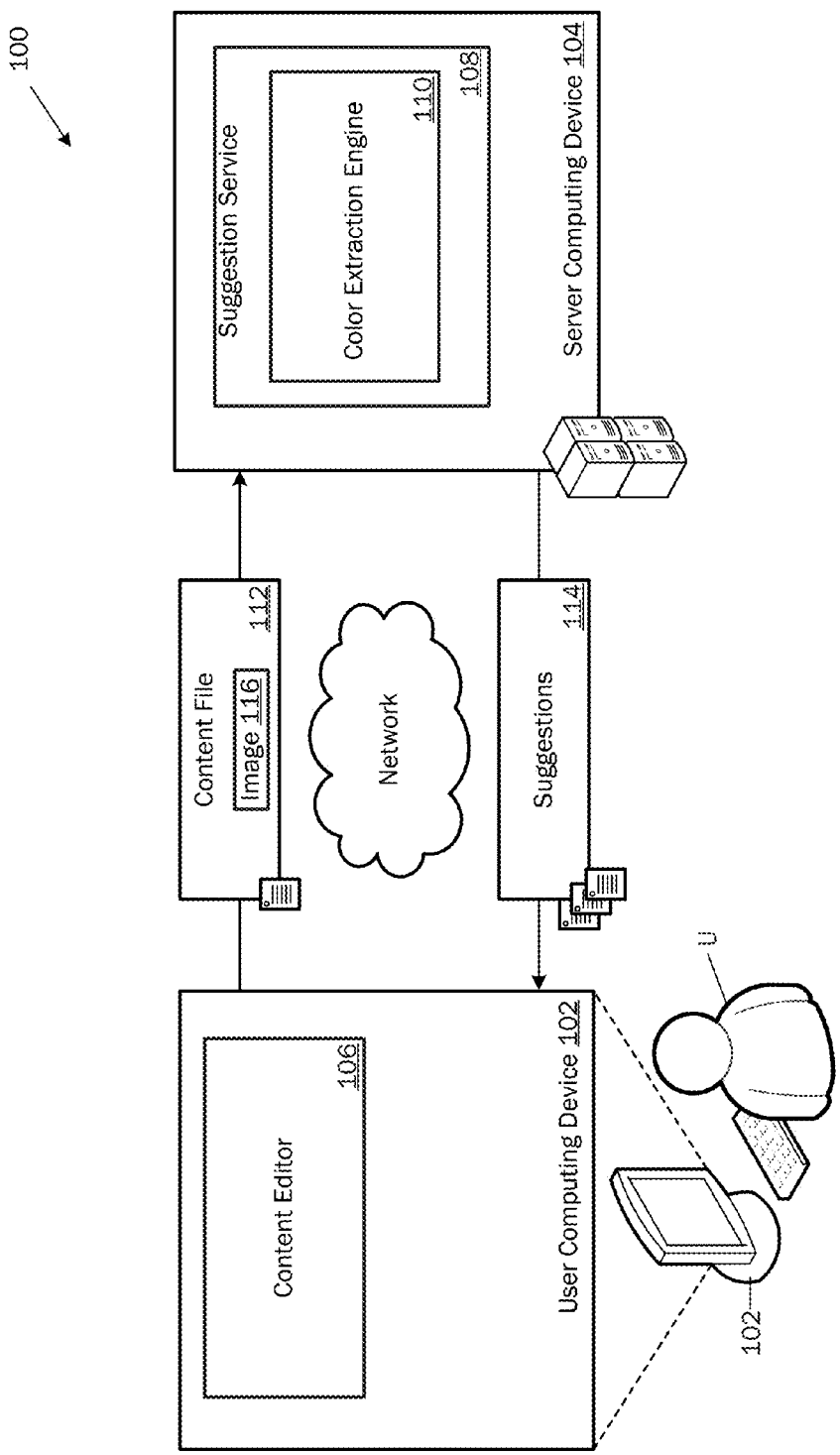
FIG. 1 is a block diagram of one example of a system for providing suggestions for a content file.

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for suggesting arrangements of content elements within content files based on image analysis including color extraction. Among other benefits, the disclosed technology may allow users to more quickly create aesthetically pleasing content files that effectively convey information and efficiently use space within the content file.

Content editors are used to create and edit content files. There are various types of content editors to edit various types of content files. Content files may include a plurality of content regions that can be consumed visually with an appropriate viewing tool. The content regions may include arrangements of content elements such as images, media, text, charts, and graphics.

For example, a presentation editor such as the POWERPOINT® presentation graphics program from Microsoft Corporation of Redmond, Wash. is used to edit presentation content files. Typically, presentation content files comprise one or more content regions in the form of slides or portions of a canvas. Additional examples of content editors include document editors such as the WORD document editing program from Microsoft Corporation of Redmond, Wash., which is used to edit document content files and spreadsheet editors such as the EXCEL® spreadsheet editing program also from Microsoft Corporation, which is used to edit spreadsheet content files. Like the presentation content files, other types of content files may also include arrangements of various content elements within content regions (e.g., pages or sections of a document content file, or sheets of a spreadsheet content file, etc.). The above listed content editors are examples and many other types of content editors are used to edit other types of content files as well. In some examples, content files are formatted with an Office Open XML File format, such as the Office Open XML Document format (which will often have a .DOCX extension), the Office Open XML Presentation format (which will often have a .PPTX extension), or the Office Open XML Workbook format (which will often have a .XLSX extension). Other formats for content files are possible as well.

In examples, a content editor presents suggestions regarding how to arrange content elements within a content region of a content file. These suggestions may be based on analyzing one or more images within the content region or that are being added to the content region. Analyzing the image may include identifying colors in the image that are suitable for use in design elements of the generated suggestions. For example, an identified accent color may be used to color a line below a title region of a content region. As another example, an identified dark color may be used as a background for light-colored text. Lines and shapes are non-limiting examples of design elements. Design elements are an example of content elements that are added to a content region to enhance the design of the content region.

For example, a content editor may present one or more suggestions for arrangements of content elements within a content region. The suggestions may be presented visually (e.g., as thumbnail images of the content regions after application of the suggestion) in a user interface generated by the content editor. In some aspects, one or more suggestions are presented in a region adjacent to an editing pane of a user interface generated by the content editor. The suggestions are ordered based on the predicted suitability of the suggestion for the content region (e.g., based on the content in the content region, themes or other design elements that have been applied to the content region, previously selected suggestions, etc.). Alternatively, the suggestions are ordered according to a different criterion or only a single suggestion is presented.

A user can then provide an input to select one of the presented suggestions (e.g., by touching/clicking on the visual presentation associated with the suggestion). In response, the content editor applies the selected suggestion to the content region. In some aspects, the selection is recorded and may be used to influence the generation of suggestions in the future (e.g., suggestions similar to previously selected or frequently selected suggestions may be scored higher and may be more likely to be presented to users).

The content editor may present suggestions in response to a triggering event. An example of a triggering event is the user adding an image to a content region. When the image is added, the image may be placed in an initial position and then suggestions may be generated. A user adding another design element such as an accent line or background shape is also an example of a triggering event. Another example triggering event is a user actuating a user interface element (e.g., a suggestions button) to indicate that suggestions should be provided. Further, in some aspects, the user editing a property of an image is a triggering event as well. For example, a user may crop an image that has been added to a content region and in response suggestions may be generated based on the cropped image. Other alterations of an image may also trigger the generation of suggestions.

In some aspects, the content editor is a component of a client computing device that interacts with a suggestion service of a server computing device. The content editor may send the content file or a portion of the content file to a suggestion service over a network. The suggestion service may then respond by sending suggestions to the client computing device. Alternatively, the suggestion service may operate on the client computing device and may even be integral with the content editor.

In some aspects, the suggestions are generated by selecting relevant blueprints and applying the selected blueprints to the content region. In some aspects, the blueprints comprise content files. In this case, the blueprint content files may include tags that identify positions in a content region for content elements and properties/characteristics for adding content elements to the blueprint. The tags may also indicate that particular content elements should be colored based on colors extracted from an image in the content region. The tags may be included in a portion of the content file that is configured to store tags. However, some content file formats do not include a portion configured to store tags. In these cases, the tags may be stored in an existing portion of the file. For example, the tags may be stored in a textual field associated with a content region (e.g., a notes field) or in a textual field associated with a content element (e.g., an alternate text field). A textual field may, for example, be a field that is configured to store text data. In this manner, existing content file formats can be used to store blueprints without requiring modification to the format. As an example, a tag associated with a placeholder image in a blueprint may indicate that the placeholder should be replaced with an image from the original content file and that the image should be cropped. The placeholder image may have certain properties such as a height, width, aspect ratio, etc. As another example, a tag associated with a shape or image in the blueprint may indicate that the shape represents an area of focus within the shape or within a separate placeholder shape or image.

As yet another example, a tag associated with a design element in a blueprint may indicate a target hue and color type for the design element. The tag may also identify a placeholder with which the design element is associated. For example, a design element such as a shape that borders a placeholder image may indicate that the border shape should be colored with an accent color (i.e., a color type) extracted from the image. Additionally or alternatively, the tag may also indicate that the border shape should colored with a color (i.e., a hue) extracted from the image.

A variety of techniques can be used to extract colors from an image. For example, a list of target colors may be maintained. The target colors may be generated based on properties of the colors such as desired chrominance and luminance values. Additionally and alternatively, the target colors may be specified by a user with the content editor 106 or another tool. At least some of the target colors may be associated with a color bucket and a type sub-bucket within a color bucket. Examples of color buckets include a greens bucket, a blues bucket, a purples bucket, a reds bucket, an oranges bucket, and a yellows bucket. Other aspects include other color buckets. Examples of type sub-buckets include intense, accent, dark, and very dark. Other aspects include other type sub-buckets. In aspects, target colors may be associated with a color bucket based on a chrominance component of the color. Further, target colors may be associated with a type sub-bucket based on a luminance component and a saturation value.

At least some of the color values of the pixels in the image are then compared to the target colors. In some aspects, a fraction of the pixels in the image are sampled to extract colors or the image is resized before extracting colors. In these aspects, the color extraction may proceed more rapidly as fewer comparison operations need to be performed.

In aspects, a color value from the pixels in the image that is similar to at least one of the target colors is identified (extracted) for use in design suggestions. In aspects, color values are similar when the distance between the color values is below a predetermined threshold.

In some aspects, multiple color values are identified as being similar to target colors. A single color value may then be identified for use in suggestions based on various factors. For example, the identified color value may be the similar color value that is most similar to a target color (e.g., based on a calculating a distance value that corresponds to the perceptual differences between a pair of color values). Alternatively, the identified color value may be the similar color value that is most similar to a target color in a color bucket that matches a theme of the content region and/or a type sub-bucket that matches a type (purpose) of the design element.

Additionally, the identified color value may be determined based on being associated with more pixels within the image or a region of the image (e.g., a salient region as described further below) than any of the other similar color values. In other aspects, the identified color value is determined based on being associated with a target percentage of the image (or the pixels in the image). For example, the identified color may be the similar color value that appears in a number of pixels that is closest to five percent of the pixels in the image as compared to the rest of the similar color values. In these aspects, a dominant color in an image is unlikely to be identified. Instead, a color that appears less frequently will be identified. Beneficially, colors identified according to these aspects, when used to color design elements in suggestions, may serve to tie the design element to a subtle aspect of the image. Additionally, some aspects compare color values exactly when determining how frequently a color appears in the image. Other aspects cluster similar color values and determine how frequently the color values in the cluster appear. Further, some aspects identify a color value from the similar color values based on the context surrounding the pixels having the color value in the image. For example, a similar color value may be identified based on being surrounded by contrasting color values in the image. Color values may also be identified based on finding color values within the image that are in a predetermined range for one or more of saturation, hue, and luminance. Similarly, some color values may be excluded from consideration based on being within a predetermined range for one more of hue, saturation, and luminance (i.e., certain color ranges may be blacklisted from use in at least some design elements).

In some aspects, the extracted colors are used to identify themes that are compatible with the image. For example, a theme that includes one or more of the extracted colors may be compatible with the image. In some aspects, suggestions may be generated using the identified themes. Further, in some aspects, in addition to compatibility with the image, themes are identified based on compatibility with or similarity to themes that are being used elsewhere in the content file.

The suggestion service may select blueprints to use in generating the suggestions based on assessing a match between the image (as well as other content elements) in the content region and the content elements and tags in the blueprint. For example, if an image in the content region is croppable and larger than the dimensions of a placeholder image on the blueprint, the blueprint may be more likely to be identified as a good match. Conversely, if an image in the content region is smaller than the placeholder image or is determined to be uncroppable, the blueprint may be less likely to be identified as a good match. Similarly, if a salient region (e.g., an area of interest) in an image from the content region is approximately the same size as the shape that is tagged as an area of focus on the blueprint, the blueprint may be more likely to be selected as a good match. The determination of a salient region and whether an image is croppable may be made by performing image processing techniques to analyze the content of the image, or by reading metadata associated with the image, or by other methods as well.

Additionally, the suggestion service may select blueprints based on the compatibility of the blueprint and a characteristic of the content region (e.g., a theme, color scheme, style, etc.). Other factors may also be used to select blueprints. For example, the amount of text or the organizational structure of text included in the content region may influence which blueprints are selected (e.g., a blueprint designed to highlight a bulleted list may be more likely to be selected for a content region that includes a bulleted list).

In some aspects, photograph images are further analyzed to identify regions over which text may be placed so that the text will likely be easy to see and read. For example, the photograph image may be analyzed to identify invariant regions. An example invariant region is a region of the image that is similar in at least one property (e.g., pixels in the region have a similar brightness or luminance value, pixels in the region have a similar color value, pixels in the region have a similar value for at least one component, etc.). Additionally, when an invariant region is identified, one or more suggested color values may be identified for use in text or other overlays on the invariant region. In some aspects, the suggested color values are selected to stand out from or contrast with the invariant region. Beneficially, text overlaid on the invariant region using the suggested color values is likely to stand out and be easy to read. Further, in some aspects, the suggested color value is extracted from elsewhere in the image using the techniques described herein.

Although the examples herein typically relate to a presentation editor on a client computing device interacting via a network with a suggestion service on a server computing device, other aspects are possible as well. For example, aspects that include other types of content editors are possible as well. Additionally, some aspects include a content editor on a server computing device or a suggestion service on a client computing device.

Further, although many of the examples herein relate to using image processing, including color extraction, to generate suggestions for content regions within content files, other aspects use color extraction for other purposes. For example, in some aspects, the techniques disclosed herein are used to identify or classify images based on extracted colors for search applications such as a web search application, web crawler application, or a local search application. Further, in some aspects, the techniques disclosed herein are used to automatically analyze web pages, blogs, and social media content.

FIG. 1 is a block diagram of one example of a system 100 for providing suggestions for a content file. As illustrated in FIG. 1, the system 100 includes a user computing device 102 that is operable by a user U and a server computing device 104. The user computing device 102 and the server computing device 104 communicate over a network.

The user computing device 102 includes a content editor 106. In the example shown in FIG. 1, a content file 112 is transmitted by the user computing device 102 to the server computing device 104. In the example shown, the content file 112 includes an image 116.

In some aspects, the content editor 106 is an application running on the user computing device 102 that is operable to create or edit content files, including adding or editing images in the content files. Additionally, in some aspects, the content editor 106 interacts with the server computing device 104. In some examples, the content editor 106 is a browser application operable to generate interactive graphical user interfaces based on content served by a remote computing device such as the server computing device 104 or another computing device. According to an example, an extension is installed on the user computing device 102 as a plug-in or add-on to the browser application (i.e., content editor 106) or is embedded in the browser application.

In an example, the content editor 106 is a presentation editor that operates to generate, edit, and display presentations that include images. The POWERPOINT® presentation graphics program from Microsoft Corporation of Redmond, Wash. is an example of a presentation editor. Other example presentation editors include the KEYNOTE® application program from Apple Inc. of Cupertino, Calif.; GOOGLE SLIDES from Google Inc. of Mountain View, Calif.; HAIKU DECK from Giant Thinkwell, Inc. of Seattle, Wash.; PREZI from Prezi, Inc. of San Francisco, Calif.; and EMAZE from Visual Software Systems Ltd. of Tel-Aviv, Israel. In other examples, the content editor 106 is a document editor such as the WORD document editor from Microsoft Corporation of Redmond, Wash. or a spreadsheet editor such as the EXCEL® spreadsheet editor also from Microsoft Corporation.

The server computing device 104 includes a suggestion service 108. The suggestion service 108 includes a color extractor engine 110. In the example shown in FIG. 1, suggestions 114 are transmitted by the server computing device 104 to the user computing device 102.

In some aspects, the suggestion service 108 operates to receive a content file 112 from the user computing device 102 and to provide suggestions 114 in response. The suggestion service 108 may comprise one or more applications that are run by the server computing device 104.

For example, in some aspects, the suggestion service 108 operates to receive a presentation file from the user computing device 102. The suggestion service 108 then analyzes at least a portion of the presentation file and transmits to the user computing device 102 suggestions for the layout or design of portions of the content file. For example, the content editor 106 may trigger a transmission of the content file 112 to the suggestion service 108 when an image is added to a slide in a presentation file. The suggestion service 108 may then analyze the image using the color extractor engine 110 to provide suggestions 114. Upon receiving the suggestions 114, the content editor 106 may present to the user U thumbnails based on the suggestions 114. The user U can make a selection and indicate to the content editor 106 to apply the selected suggestion to the content file 112.

Figure 2:
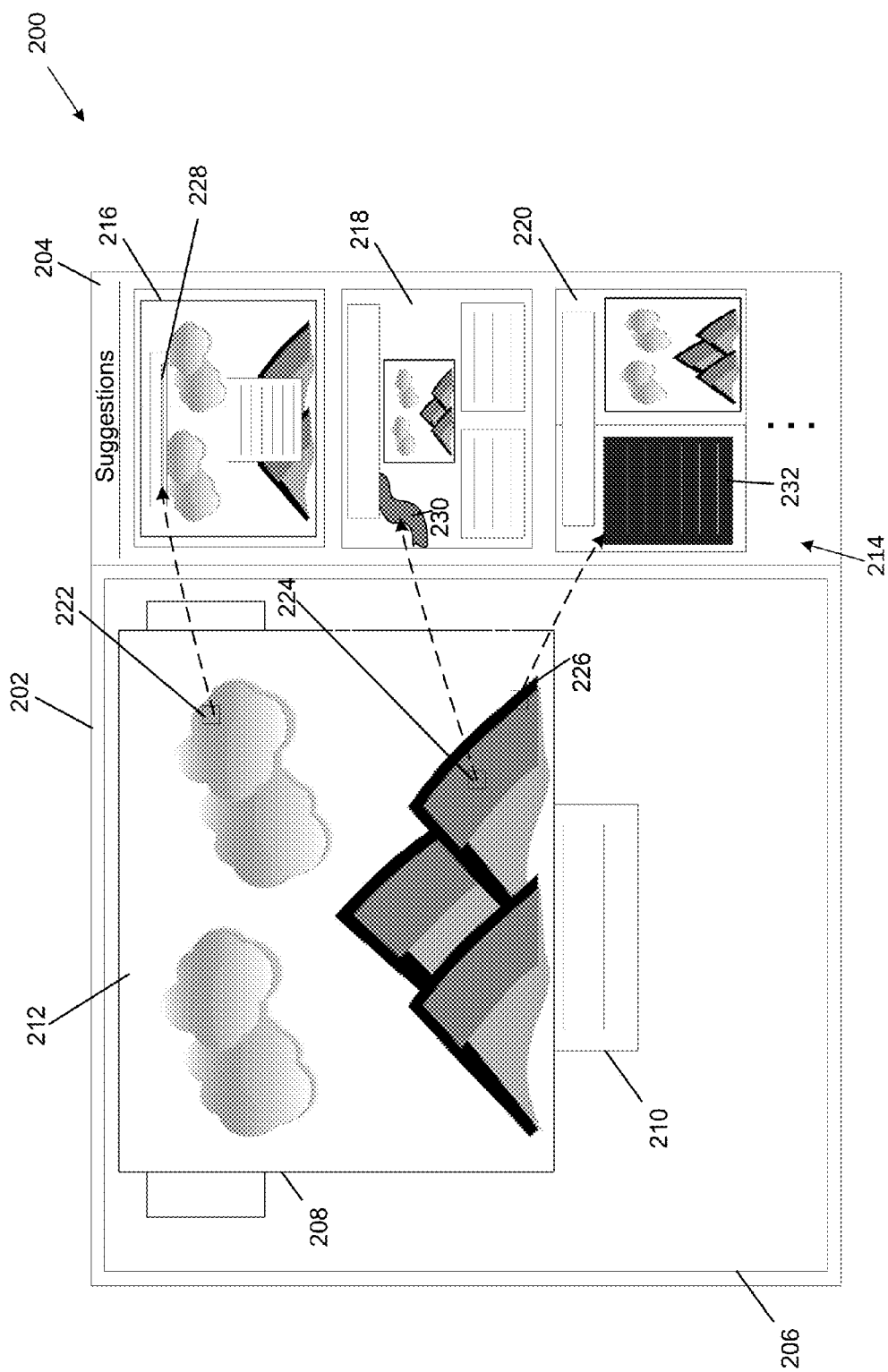
FIG. 2 illustrates an example user interface screen generated by aspects of the content editor of FIG. 1.

FIG. 2 illustrates an example user interface screen 200 generated by aspects of the content editor 106 and displayed by the user computing device 102. In this example, the screen 200 includes a content region display area 202 and a suggestion display area 204.

The content region display area 202 operates to display one or more content regions from a content file. In some aspects, a user can interact with and modify the content region that is displayed by adding, removing, repositioning, or otherwise modifying various content elements that are displayed in the content region display area 202.

In this example, the content region display area 202 displays a slide 206 from an example presentation content file. The slide 206 includes a header region 208, a list region 210, and an image 212. The image 212 has been recently added to the slide 206 by a user, but has not yet been positioned to fit well with the other content elements. Instead, the image 212 occludes the header region 208 and the list region 210. This exemplary positioning of image 212 may be typical of the initial positioning of newly added images.

Although the image 212 is shown near the upper-right corner of the slide 206 in this example, in some aspects, the initial placement of the image 212 may be placed elsewhere on the slide 206. For example, the initial placement of image 212 may depend on various factors such as, but not limited to, whether the image 212 is being inserted into a content placeholder (i.e., a predefined area of the slide 206), a position of the content placeholder, a type of content placeholder, a size of the content placeholder, and a size of the inserted image.

In this example, the image 212 includes a plurality of different colors, including accent color 222, dark color 224, and very dark color 226. These three colors are illustrative of aspects disclosed herein and are meant to represent example colors that could be extracted in some aspects. Of course, the image 212 includes many other colors besides the three that are identified as examples herein.

The suggestion display area 204 comprises a list 214 of suggestions for the slide 206. In this example, the list 214 includes a first suggestion 216, a second suggestion 218, and a third suggestion 220. Other aspects include fewer or more suggestions. The suggestions are shown as thumbnails, which, upon being selected, cause the slide 206 to be arranged in accordance with the suggestion. Although thumbnails are discussed, one skilled in the art may envision various alternative methods of displaying generated suggestions, such as in a new window, in a drop down menu, nested within a ribbon in the application, etc.

The suggestion display area 204 is shown as a vertical bar on the right side of the screen 200. However in other aspects, the suggestion display area 204 is shown as a drop down menu or a separate window or is placed horizontally above or below the content region display area 202. Still further, the suggestion display area 204 may be located elsewhere.

In some aspects, after the user adds the image 212 to the slide 206, the content editor 106 automatically sends the presentation content file or a part thereof (e.g., the slide 206) to the suggestion service 108 on the server computing device 104. In response, the suggestion service 108 sends back the list 214 of suggestions. The list 214 of suggestions may be ordered based on a predicted likelihood the suggestion will be selected (e.g., the suggestion service 108 may calculate scores for each of the suggestions based on how well the content region fits the suggestion). For example, the suggestion shown at the top of the list may be predicted to be the most likely to be selected. Alternatively, the suggestions may be ordered otherwise as well.

The suggestions may include various arrangements of the content elements of the slide 206. The suggestions may include variations of content color, content size, content position, content type, number of content placeholders, suggested content, background, theme, or other properties of the slide. Content design suggestions may be based on analysis of content on the slide 206 including the image 212, content on the previous or next slide, content within the entire content file, a theme associated with the content file, user history data, user preferences, rules or heuristics about types of content, or other data. In some aspects, the suggestions are generated using blueprints that may be selected based on at least some of the above-mentioned factors as well as other factors.

For example, the suggestions may include arrangements of text, images, charts, video, or any combination thereof. In the example of FIG. 2, the first suggestion 216 includes the image as a full sized background with the header and list overlaid thereon. Additionally, the header includes an accent bar 228 that has been colored to match the example accent color 222 extracted from the image 212. The second suggestion 218 includes the image centered on the slide with the header positioned above the image and the list divided in two parts below the image. Additionally, the second suggestion 218 includes a design element 230 that has been colored to match the example dark color 224 extracted from the image 212. The third suggestion 220 includes a cropped version of the image on the left side of the slide with the header positioned above it and the list positioned to the right of it. Additionally, the list is overlaid on a background 232 that has been colored to match the example very dark color 226 extracted from the image 212. In some aspects, the third suggestion 220 is generated based on the suggestion service 108 determining that the image 212 is croppable. The first suggestion 216, the second suggestion 218, and the third suggestion 220 are just examples. And many other suggestions are possible as well. For example, some suggestions may crop the image differently, include additional content elements that are colored to match one or more colors extracted from the image 212, or add various content elements to accentuate the image or a portion of the image. Additionally, in some aspects, suggestions are generated that include themes that are determined to be compatible with the image based on the colors that have been extracted. In some aspects, the number of suggestions depends on the content that is inserted, the content that is already on the slide, the content on other slides in the same content file, user history with the content, and/or the preferences of the user.

In some aspects, the suggestion service 108 analyzes the content and thereafter provides additional design suggestions for displaying other content on a slide. For example, if a slide includes statistics in the form of text, the presentation application may analyze the data and provide alternative means of displaying this data on a slide, such as in the form of a graph. As an example, if a quadratic equation had been entered in a text content placeholder, then a content design suggestion may include a chart of a parabola. The suggestion service 108 may query a search server for additional content of the same or of a different content type to display with or instead of the content. Alternatively or additionally, the suggestion service 108 may retrieve related, supplemental data from a repository or a database and insert additional data not included on the slide. For example, the presentation application may include additional statistics, related to content inserted on the slide that is retrieved from a database. As another example, if a user added an image of a beach, the suggestion service may analyze this image and generate suggestions that incorporate alternative pictures of beaches retrieved from a database. Hence, the suggestions may be used to supplement content on a slide or used to entirely replace content on a slide.

Further, in some aspects, the suggestion service 108 generates suggestions that include textual elements disposed in an invariant region of the image 212. As an example, a portion of the sky may be identified as an invariant region in a landscape photograph. Additionally, the suggestion service 108 may present the textual element in a color that is determined to stand out from the identified invariant region. Continuing the landscape example, if an invariant region is identified in a landscape photograph as a portion of light blue sky, the suggestion service 108 may generate a suggestion that include a dark colored textual element overlaid on the sky portion of the image. In some aspects, the dark colored textual element may match a dark color extracted from the image 212, such as the example dark color 224 or the example very dark color 226.

Figure 3:
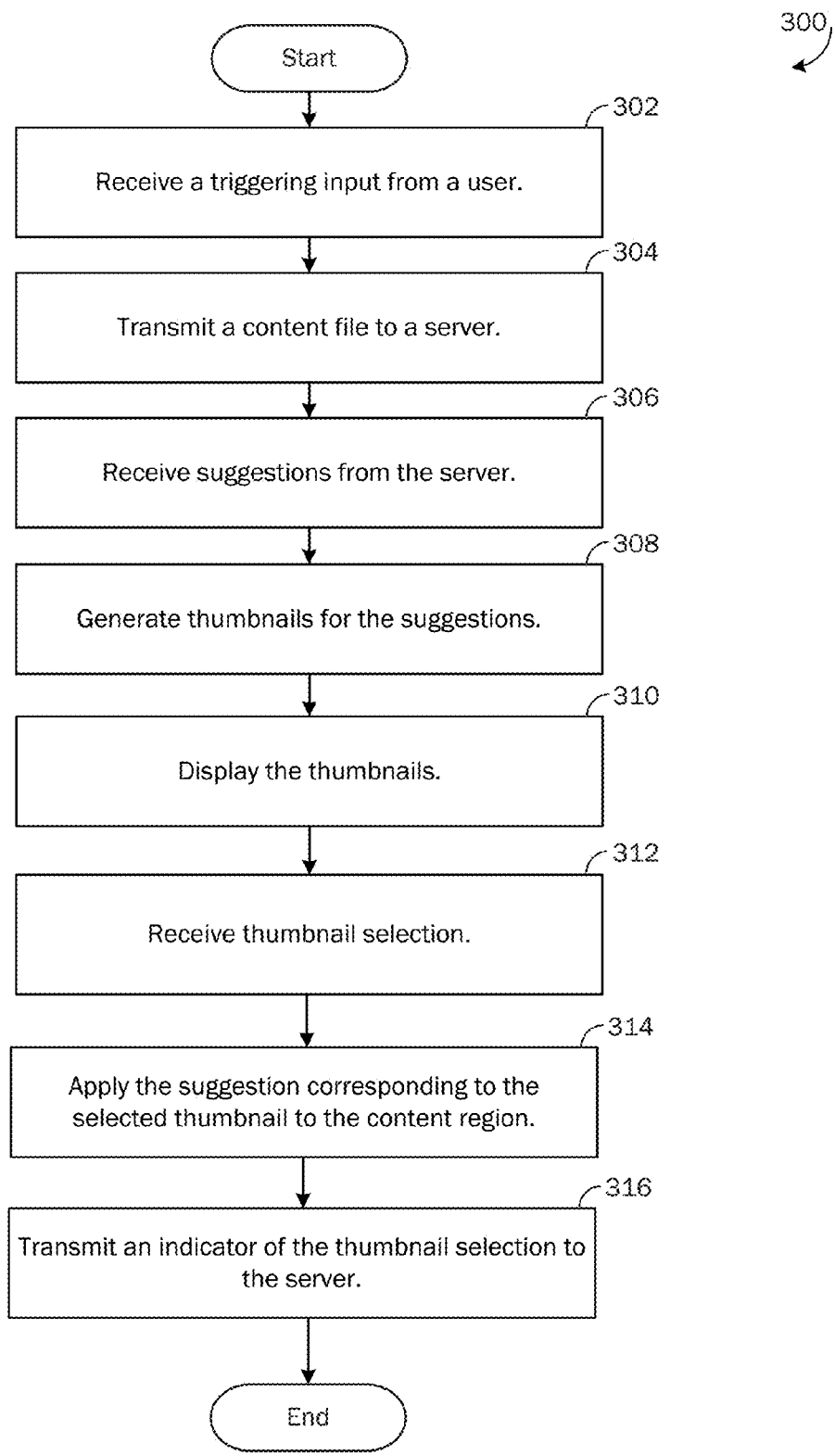
FIG. 3 illustrates a method for using suggestions to arrange a content file performed by aspects of the content editor of FIG. 1.

FIG. 3 illustrates a method 300 for using suggestions to arrange a content file. As an example, the method 300 may be executed by a component of a system such as the system 100. For example, the method 300 may be performed by the content editor 106 to receive and use suggestions from the suggestion service 108. In examples, the method 300 may be executed on a device comprising at least one processor configured to store and execute operations, programs, or instructions.

At operation 302, a triggering input is received from a user. Various aspects include various types of triggering inputs. An example triggering input is an image being inserted into a content region of a content file. Additionally, in some aspects, receiving an input to modify a property of an image (e.g., a crop setting, color setting, etc.) in a content region is a triggering event. Another example triggering input is another type of content element being inserted into a content region of a content file. Yet another example of a triggering input is a user actuating a user-actuatable control (e.g., a button or menu option to request suggestions). Further, in some aspects, any modification to the content, including the arrangement of the content, within a content file is a triggering event. In these aspects, suggestions are continuously provided as the user creates and edits the content region.

At operation 304, the content file is transmitted to the server computing device 104. In some aspects, the entire content file is transmitted. In other aspects, a portion of the content file is transmitted such as the content region (e.g., a slide, a page, a sheet) that was affected by the triggering event. Because many triggering events may occur while a user is editing a content file with the content editor 106, some aspects transmit portions of the content file that have changed since a prior triggering event to the server computing device 104. Beneficially, at least some of these aspects reduce the amount of data that must be transmitted over the network and reduce the amount of time required for suggestions to be received.

At operation 306, suggestions are received from the server computing device 104. The suggestions may be generated by the suggestion service 108. As described herein, in some aspects, the suggestions are generated using the color extractor engine 110. Various numbers of suggestions may be received. In some aspects, the suggestion service 108 determines a number of suggestions to return to the content editor 106. For example, the suggestion service 108 may return a predetermined number of suggestions. Additionally or alternatively, the suggestion service 108 may return suggestions that exceed a predetermined relevance threshold (e.g., based on a calculated score for relevance or suitability for the content region and/or content file). Additionally, in some aspects, the content editor 106 specifies a number of suggestions to return. Additionally, the server may not return any suggestions if the suggestion service 108 is unable to generate any relevant suggestions.

In one example, the received suggestions comprise lists of actions to perform on the content region to arrange the content elements in accordance with the suggestion. In other aspects, the received suggestions may comprise content files or partial content files containing the content region to which the suggestion pertains.

At operation 308, thumbnails are generated for the suggestions. In some aspects, the thumbnails are generated by applying the list of actions to a copy of the content region and then generating an image of the updated copy of the content region. Alternatively, if the received suggestions comprise updated content regions, the updated content regions may be rendered and used to generate the thumbnail images.

At operation 310, the generated thumbnails are displayed. In some aspects, thumbnails for all of the received suggestions are displayed. In other aspects, thumbnails for a portion of the suggestions are displayed. For example, a slider or other type of user-actuatable control may be provided to allow a user to request that thumbnails for additional suggestions be displayed.

At operation 312, a thumbnail selection is received. For example, the selection may be received when a user touches, swipes, clicks, or double-clicks on one of the thumbnails. In other aspects, a user may indicate a selection by actuating a user interface element.

At operation 314, the suggestion corresponding to the selected thumbnail is applied to the content region of the content file. By applying the suggestion to the content region, the content region is arranged in accordance with the suggestion. In some aspects, the content elements from the suggestions are copied or merged into the content region. Additionally or alternatively, a series of actions are applied to the content region to transform the content region to match the selected thumbnail.

At operation 316, an indication of the selection is sent to the server computing device 104. The server computing device 104 may store this indication to generate usage statistics for the suggestions. As mentioned previously, the suggestions may be generated using blueprints. In some aspects, the usage statistics are generated for the blueprints. Additionally, in some aspects the usage statistics are generated for subsets of the received content files based on properties of the content file. For example, the usage statistics may be generated separately for content regions that include a bulleted list and content regions that include a paragraph of text. Additionally, the statistics may be calculated in a manner that incorporates information about the user. For example, statistics may be generated for a specific user, multiple users who are associated with a particular organization, or users who are associated with a certain region. Additionally, the usage statistics may be calculated based on the extracted colors that were included in the suggestion. The usage statistics may be used by the suggestion service 108 to adjust the model used for selecting blueprints for use in generating suggestions.

In some aspects, once a thumbnail is selected and applied to a content region, the other thumbnails are no longer displayed. Alternatively, the other thumbnails remain visible after the selection is received so that a user may change the selection.

Figure 4:
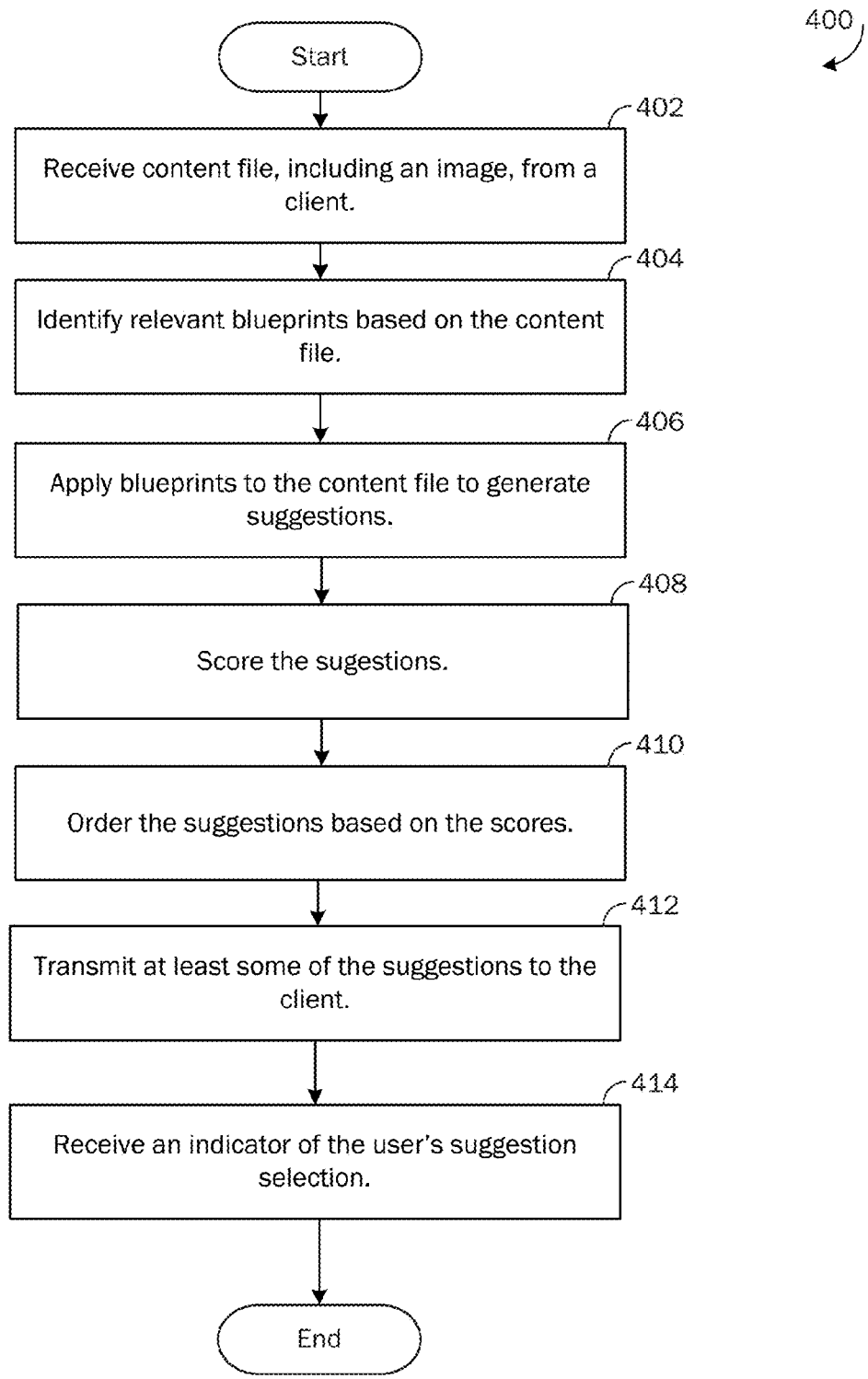
FIG. 4 illustrates a method for generating suggestions for a content file performed by aspects of the suggestion service of FIG. 1.

FIG. 4 illustrates a method 400 for generating suggestions for a content file that includes an image. As an example, the method 400 may be executed by a component of a system such as the system 100. For example, the method 400 may be performed by the suggestion service 108 to generate and transmit suggestions to the content editor 106. In examples, the method 400 may be executed on a device comprising at least one processor configured to store and execute operations, programs, or instructions.

At operation 402, a content file that includes an image is received from a client such as the user computing device 102. In some aspects, the entire content file is received. In other aspects, a content region containing the image is received. Additionally, in some aspects, the image is identified as being recently added to the content region. The image may be disposed in an initial position within the content region such as overlaying and occluding other previously-added content elements. Further, in some aspects, the image may be added, but not yet positioned within the content region.

At operation 404, relevant blueprints are identified based on the content file and the content elements therein. Various factors may be used to determine that a blueprint is relevant. For example, relevant blueprints may be associated with or compatible with a theme that has been applied to the content region or a theme that matches a color extracted from the image by the color extractor engine 110. Additionally, relevant blueprints may include placeholders that correspond well to the content elements on the slide (e.g., the same number of placeholders as content elements, placeholders with compatible dimensions, etc.). Additionally, a blueprint may be identified as relevant based on matching a determined property of a content element of the content file (e.g., a particular blueprint may be more appropriate for content elements that include images of charts). In some aspects, the suggestion service 108 analyzes an image included in the content file to determine various properties (e.g., whether the image is a photograph, whether the image is croppable, whether the image includes a chart, whether the image includes an invariant region that would be good for displaying text, etc.) of the image that may then be used to identify relevant blueprints.

At operation 406, the identified relevant blueprints are applied to the content file to generate suggestions. In some aspects, the content elements of the content region are mapped to placeholder content elements in the blueprint. For example, a title text within the content file may be mapped to a title placeholder in the blueprint. Similarly, an image content element from the content region may be mapped to an image placeholder. Depending on the dimensions of the image and the placeholder, as well as the results of any image analysis performed by the suggestion service 108, the image may be cropped or resized to fit the placeholder.

Additionally, the image may be positioned so that a salient region of the image is disposed within an identified focus area on the blueprint. Additionally, in some aspects, some or all of the content elements in the blueprints are modified to match a color extracted from the image by the color extractor engine 110.

At operation 408, the generated suggestions are scored. In some examples, the suggestions are scored based on a predicted likelihood that the suggestion would be selected by a user. The scores may be based on a variety of factors. For example, blueprints that are associated with the same theme as the content region may be scored higher than otherwise equal blueprints that are not associated with the same theme as the content region. Additionally, blueprints that require less modification (e.g., cropping or resizing) of the images included in the content region may be scored higher than blueprints that require more modification. A blueprint that has a defined focus region that aligns with a salient region of an image content element from the content region may score higher than a blueprint that does not include a focus area or a blueprint that includes a focus area that does not align well with a salient region of a content element of the content region. Additionally, the score may be based on a popularity of the blueprint with the user, an organization the user is associated with, or the general public (e.g., as determined by previous selections). Further, the score may be based on similarity between the blueprint and other blueprints that have been previously applied to other content regions of the content file.

At operation 410, the suggestions are ordered based on the scores. At operation 412, at least some of the suggestions (e.g., the highest scoring suggestions) are transmitted to the content editor 106. The suggestions may be transmitted in a number of ways. For example, the suggestions may be transmitted as multiple lists of steps that when applied will transform the content region according to the suggestion. Alternatively, the suggestions may be transmitted as an updated content region that has had the suggestion applied.

At operation 414, an indicator of the suggestion selected by the user is received. For example, the content editor 106 may transmit a message containing an indicator of the user's selection. As described previously, the selection may be stored and used to generate usage statistics that may be used to improve the way suggestions are generated in response to future requests.

Figure 5:
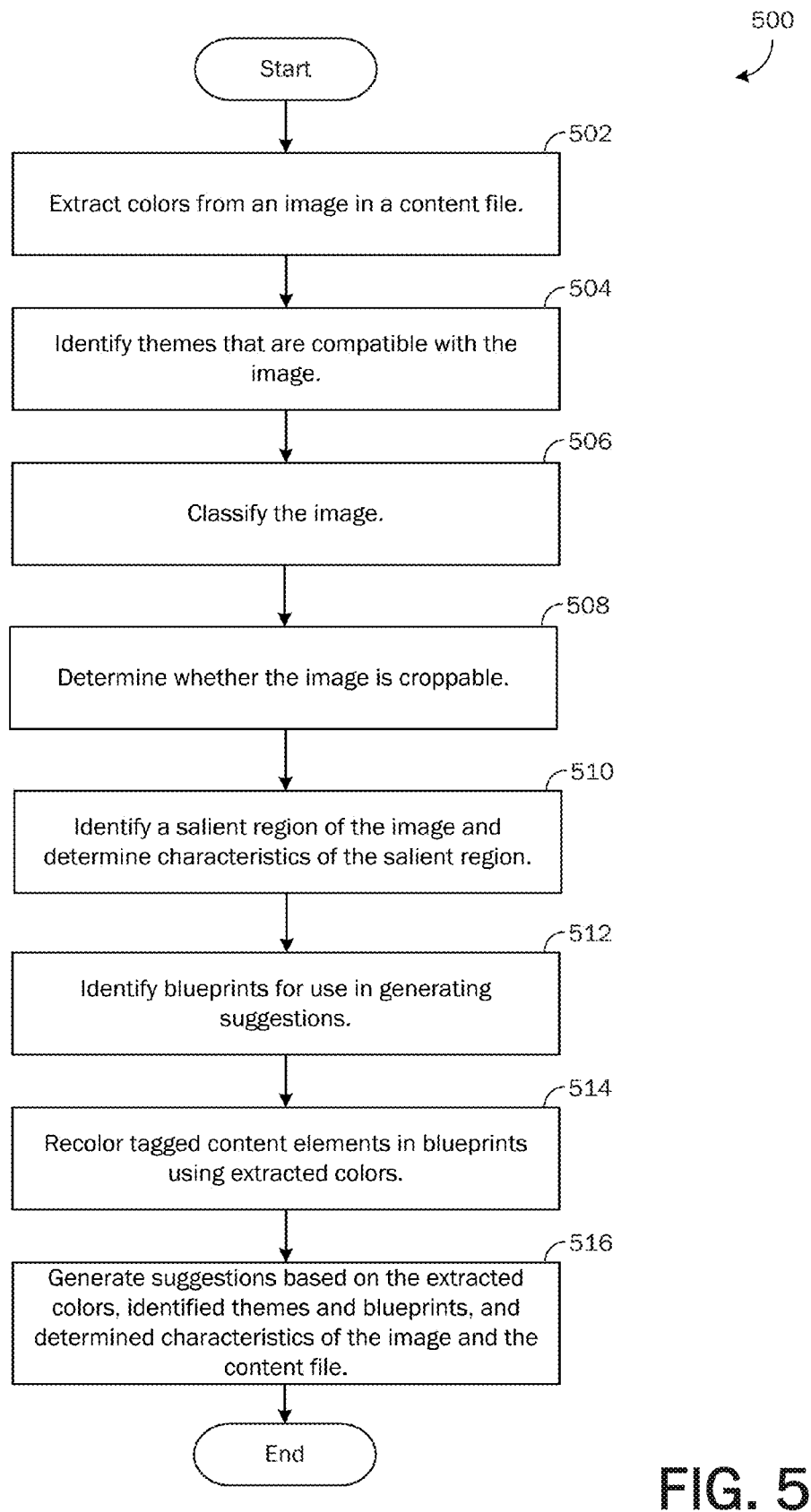
FIG. 5 illustrates a method for identifying relevant blueprints and generating suggestions for a content file based on color extraction performed by aspects of the suggestion service of FIG. 1.

FIG. 5 illustrates a method 500 for identifying relevant blueprints and generating suggestions for a content file based on color extraction. As an example, the method 500 may be executed by a component of a system such as the system 100. For example, the method 500 may be performed by the suggestion service 108 to generate and transmit suggestions to the content editor 106. In examples, the method 500 may be executed on a device comprising at least one processor configured to store and execute operations, programs, or instructions.

At operation 502, colors are extracted from an image in a content file. In aspects, the colors are extracted by comparing at least some of the colors in the image to target colors. Example methods for extracting colors from image are illustrated and described in at least FIGS. 7-10.

At operation 504, themes that are compatible with the image are identified. In some aspects, a theme comprises a pattern for a slide or group of slides and may include layout elements (e.g., placeholders for titles, headers, lists, footers, and other types of content), colors, fonts, shapes, images, and background styles and images. A theme may be applied to all content regions within a content file or a subset of the content regions. Some content files may include multiple themes such that different content regions are associated with different themes.

In some aspects, themes are identified that include or are compatible with one or more of the colors extracted from the image. Some aspects maintain lists or tables that associate themes with colors. In at least some of these aspects, a query is performed to identify the themes associated with the colors extracted from the image.

At operation 506, the image is classified. In some aspects, multiple images may be classified. Classifying the image may comprise determining whether the image is a photograph or graphic (e.g., a chart, clip art, screenshot, etc.). In later operations, the results of this classification may be used to select appropriate blueprints. For example, some blueprints may fit well with a chart, while others may fit well with a photograph. Various techniques may be used to classify the image. For example, image processing techniques may analyze some or all of the pixels of the image to classify the image. In some aspects, the image may include metadata that are evaluated to determine or influence the determination of the content type (e.g., an image that includes metadata specifying a camera make and model may be indicative of the image being a photograph).

At operation 508, it is determined whether the image is croppable. For example, an image may be croppable if it is determined that a portion of the image can be removed (or hidden). The image may be cropped to remove an outer portion, such as a horizontal strip along the top or bottom of the image or a vertical strip along one of the sides. In some aspects, an image is determined to be croppable based on metadata associated with the image or a setting/parameter specified by the content editor 106. Additionally, in some aspects, an image is determined to be croppable if it is a photograph and a portion of the image can be removed without affecting the identified salient region. Further in some aspects, a photograph is determined to be not croppable if the photograph is a vignette (e.g., a product photo with a uniform background surrounding the product) or includes a text overlay.

At operation 510, a salient region of the image is identified and characteristics of the salient region are determined. In some aspects, the salient region comprises a portion of the image that appears to be most important (e.g., most prominent or noticeable). For example, a face may be identified as a salient region of an image of a person. The salient region may comprise a single contiguous region. Alternatively, the salient region may comprise multiple contiguous regions. Various image analysis techniques may be used to identify the salient region. For example, facial recognition techniques may be used to identify a portion of an image containing a face. Other techniques may be used as well, such as by identifying regions of high contrast or high variation, regions containing text, etc.

In aspects, various characteristics of the identified salient region are determined. For example, in some aspects, the height, width, and aspect ratio of the salient region are determined. Additionally, in some aspects colors are extracted from the salient region in accordance with the color extraction aspects described herein. Further, other aspects may determine other characteristics of the salient region as well.

At operation 512, blueprints are identified for use in generating suggestions. Blueprints may be identified based on compatibility with a current theme of the content file. Blueprints may also be identified based on compatibility with themes that have been identified as being compatible with colors extracted from the image or a portion of the image such as the identified salient region.

In aspects, blueprints may be theme-specific or generally applicable. Theme-specific blueprints are designed for one or more particular themes. Generally-applicable blueprints are designed to be compatible with any or nearly any theme (or at the least are not designed for specific themes). In some aspects, the blueprints include metadata that identify whether the blueprint is theme-specific and further which themes the blueprint is compatible with. In some aspects, when the blueprint is stored using an existing format for a content file, the metadata are stored in and extracted from text fields in the blueprint files (e.g., a notes field associated with a content file or a content region in the content file). Additionally, in some aspects, when the blueprints are stored using an existing format for content files, the blueprints can have a theme applied in a similar manner to any other content file. In some aspects, blueprints are identified by searching for blueprints that include metadata indicating that the blueprint is associated with the theme of the content region. In aspects, depending on how many theme-specific blueprints are identified, generally-applicable blueprints may be identified as well. Additionally, in some aspects, blueprints are identified by searching for blueprints having the same theme as or a similar theme to the theme of the content region for which suggestions are being generated or other themes identified in operation 504.

In some aspects, the suggestion service 108 may use a table or index to identify blueprints that are compatible with particular themes. In these aspects, the suggestion service 108 queries the table or index for blueprints compatible with the theme of the content region for which suggestions are being generated or the themes identified in operation 504. Additionally or alternatively, the blueprints may be organized in a hierarchical structure such as a directory structure that indicates the themes with which the blueprints are compatible (e.g., a first directory containing blueprints that are compatible with a first theme, a second directory containing blueprints that are compatible with a second theme, and third directory containing blueprints that are generally applicable, etc.). In these aspects, the blueprints may be identified by determining an appropriate directory and identifying the blueprints contained therein.

At operation 514, tagged content elements of the identified blueprints are recolored using the extracted colors. For example, a content element in a blueprint that indicates to use an accent color will be recolored to match an accent color extracted from the image. Likewise, content elements in a blueprint that indicate to use an intense color, a dark color, and a very dark color will be recolored to match an intense color, a dark color, and a very dark color extracted from the image, respectively. Other aspects may include other tags to indicate the extracted colors to use. Further, some aspects specify additional information in the tags as well such as which hue (or color bucket) the extracted color should be retrieved from. An example tag in these aspects may specify to recolor a content element using a blue accent color.

At operation 516, suggestions are generated using the identified blueprints with recolored content elements. In aspects, the suggestions are generated based on the extracted colors, identified themes and blueprints, and determined characteristics of the image and the content file. In some aspects, only some of the identified blueprints are used to generate suggestions. For example, blueprints that have an image placeholder of the same or similar size to the image may be selected. Additionally, if the image is croppable, additional blueprints having image placeholders that have a size to which the content element can be cropped may be selected as well. In some aspects, the amount of text or presence of a bulleted list may also be used in selecting blueprints from the identified blueprints. In various aspects, various numbers of blueprints are selected.

Figure 6:
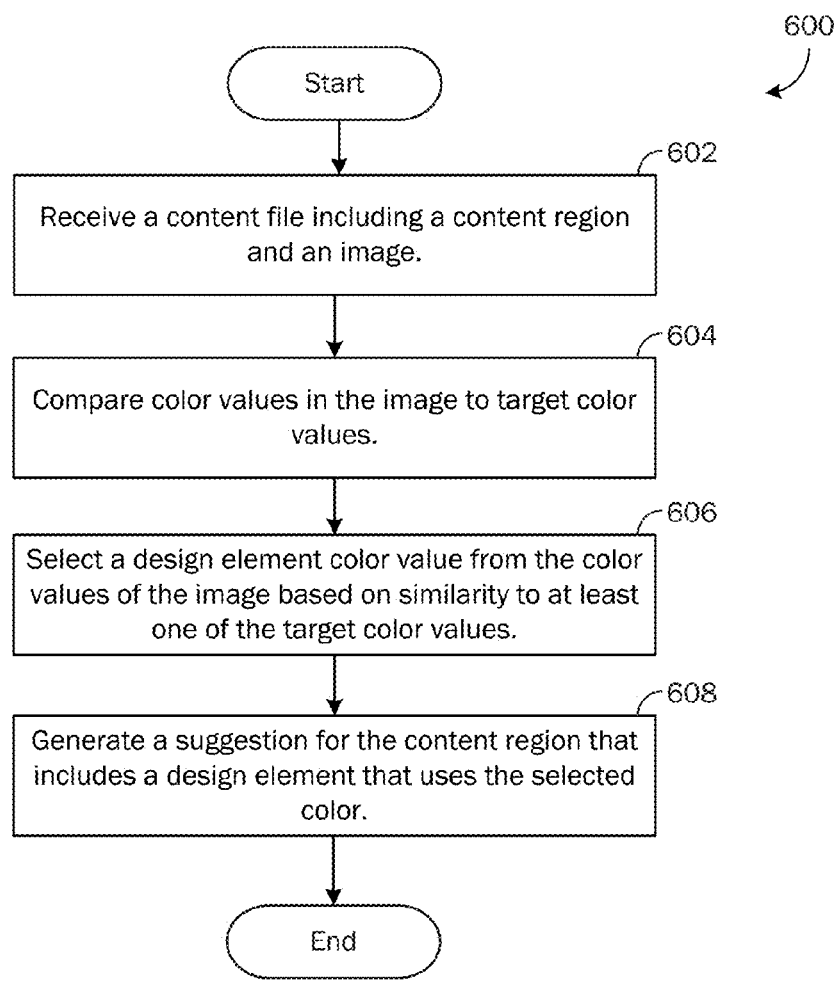
FIG. 6 illustrates a method for generating a suggestion for a content region that includes an image performed by aspects of the color extraction engine of FIG. 1.

FIG. 6 illustrates a method 600 for generating a suggestion for a content region that includes an image. As an example, the method 600 may be executed by a component of a system such as the system 100. For example, the method 600 may be performed by the color extractor engine 110 to extract colors from the image for use in the suggestion. In examples, the method 600 may be executed on a device comprising at least one processor configured to store and execute operations, programs, or instructions.

At operation 602, a content file including a content region and an image is received. In some aspects, the content file is received by the suggestion service 108 from the content editor 106.

At operation 604, color values in the image are compared to target color values. In some aspects, the image comprises pixels and color values associated with some or all of the pixels are compared to the target color values. To improve performance in some aspects, the image may be resized or pixels sampled from the image are compared to the target colors. In some aspects, there are one or more target color values. The target color values may be pre-defined based on a hue (e.g., blue, red, green, etc.) or a type/purpose (intense, accent, dark, very dark, etc.). Additionally or alternatively, target color values may be specified in a theme or elsewhere. Various metrics can be used to compare the color values in the image to the target color values. For example, in some aspects, a distance between a color value in the image and a target color value is calculated according to equation 1 below.

Equation 1:

$$D = \sqrt{(H_i - H_t)^2 + (S_i - S_t)^2}; \text{ where}$$

D is the distance between the image color value (e.g., from a particular region or pixel) and the target color value;
$H_i$ is the hue of the image color value;
$H_t$ is the hue of the target color value;
$S_i$ is the saturation of the image color value; and
$S_t$ is the saturation of the target color value.

In other aspects, other equations may be used to calculate the distance as well.

At operation 606, a design element color value from the color values of the image is selected based on similarity to the target color values. In some aspects, the color value from the image that is most similar to any of the target color values is selected. In some aspects, the color value from the image that is most similar to a target color value of a specific type is selected. For example, a blueprint may specify to use an accent color for a particular design element and the color value from the image that is most similar to a target accent color value is selected. Further, in some aspects, the color values from the image that are closest to each of the target colors are selected and then the color value with the highest saturation value is selected from among those color values. Additionally, the color values from the image may be compared to a predetermined list or range of color values that have been identified as being undesirable for use as a design element color. Color values from the image that match (or are within a threshold distance) of the undesirable colors are excluded from being selected for use on a design element.

At operation 608, a suggestion is generated for the content region that includes a design element that uses the selected color. In some aspects, multiple design elements within the content region are colored using one or more selected colors.

Figure 7:
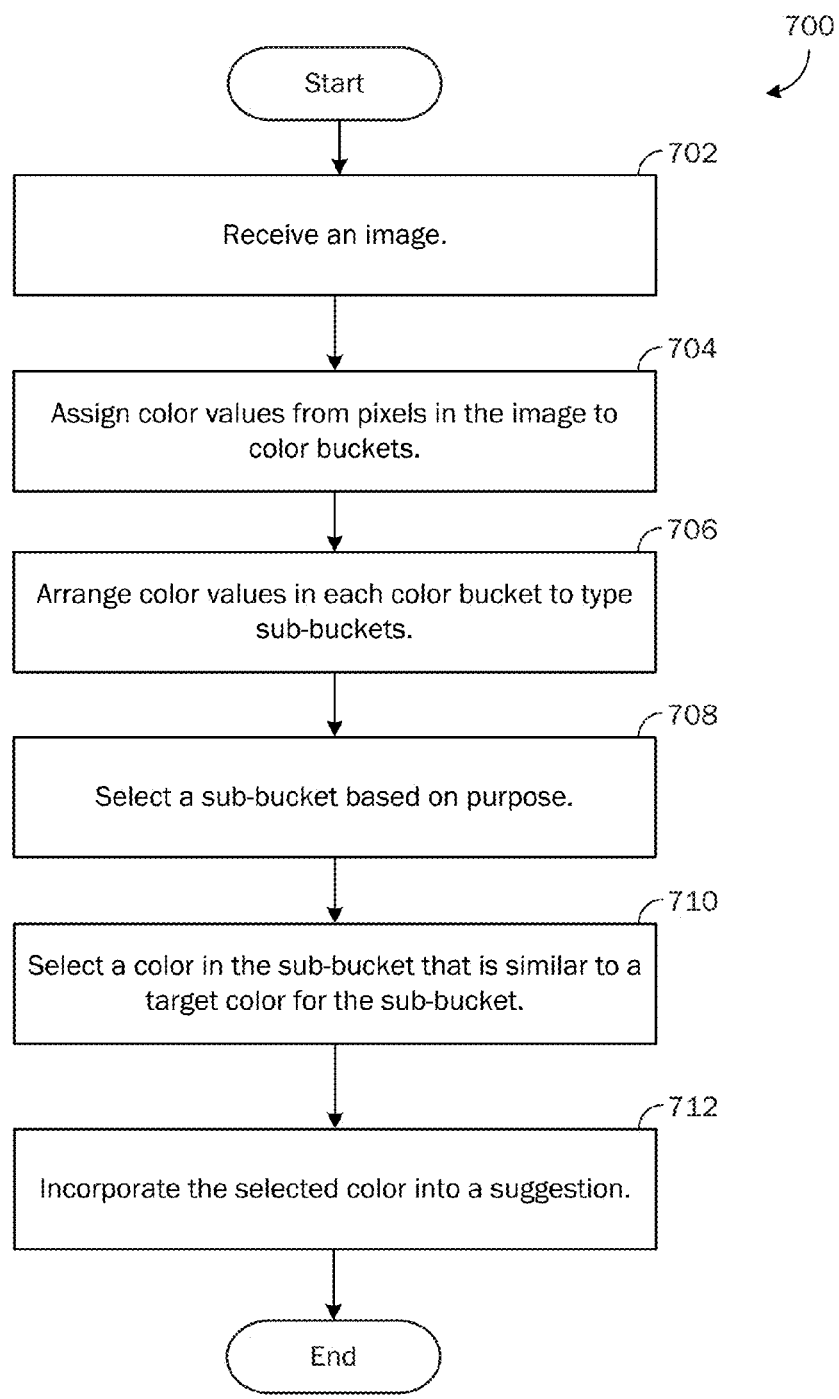
FIG. 7 illustrates a method for extracting a color from an image performed by aspects of color extraction engine of FIG. 1.

FIG. 7 illustrates a method 700 for extracting a color from an image. As an example, the method 700 may be executed by a component of a system such as the system 100. For example, the method 700 may be performed by the color extractor engine 110 to extract colors from an image for use in content elements of a suggestion. In examples, the method 700 may be executed on a device comprising at least one processor configured to store and execute operations, programs, or instructions.

At operation 702, an image is received. In some aspects, the image is received from a content region of a content file for which the suggestion service 108 is generating suggestions. In other aspects, the image may be received from an image search application such as a search engine. Additionally, the image may be received from a web crawler application that analyzes web pages or social media content.

At operation 704, the color values from the pixels in the image are assigned to color buckets. In some aspects, color values from all of the pixels in the image are assigned to color buckets. In other aspects, the image is resized or the pixels in the image are otherwise sampled to decrease the number of assignments that need to be performed. In this manner, the performance of the method 700 can be increased. The assignment may be based on the chrominance component of the color values associated with the pixels.

Figure 8:
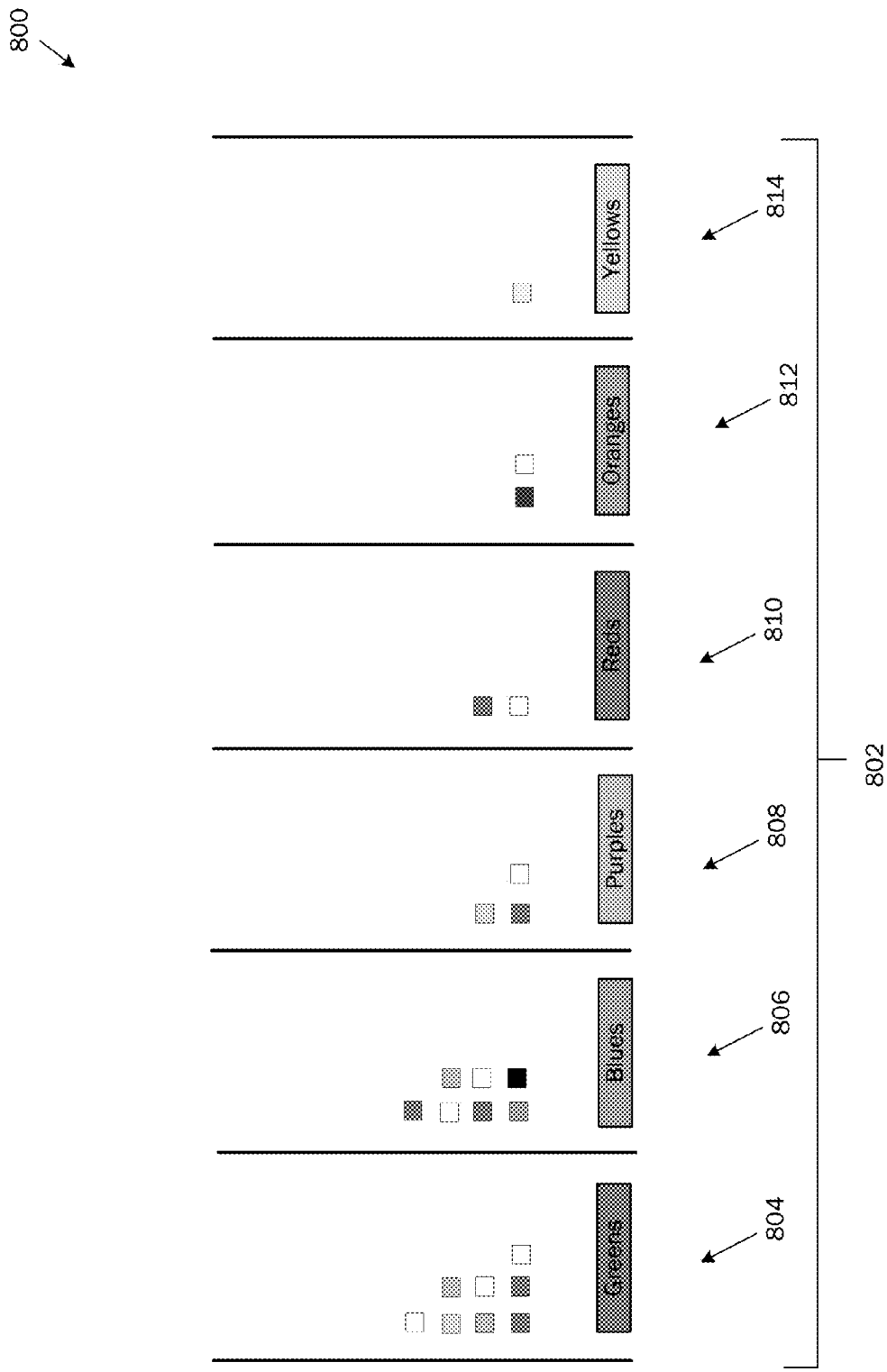
FIG. 8 illustrates an assignment of color values from an image to color buckets performed by aspects of the color extraction engine of FIG. 1.

Referring now to FIG. 8, an illustration 800 of color values from pixels in an image being assigned to color buckets 802 is provided. In FIG. 8, the color buckets 802 include a green color bucket 804, a blue color bucket 806, a purple color bucket 808, a red color bucket 810, an orange color bucket 812, and a yellow color bucket 814. Other aspects include more, fewer, or additional color buckets. Also shown in FIG. 8 are multiple color values in each of the color buckets 802. These color values have been extracted from an image and assigned to the appropriate color buckets. The illustration 800 is for purposes of illustrating the operation of assigning pixels to color buckets and is typically not actually generated. Instead, one or more data structures (e.g., sets) are used to track at least some of the color values that have been assigned to at least some of the color buckets 802. Additionally, upon completion of operation 704 on a typical image, there would be many more color values in at least some of the color buckets 802.

Returning now to FIG. 7, at operation 704, the color values assigned to each of the color buckets are assigned to type sub-buckets. The type sub-buckets may correspond to a purpose for which the extracted color will be used. In some aspects, the assignment to a type sub-bucket is based at least in part on a luminance (i.e., brightness) component of the color value. Additionally or alternatively, the assignment to a type sub-bucket is based on a saturation value. In some aspects, various threshold values for luminance, saturation, or both are used to divide between type sub-buckets. The threshold values may be the same across all of the color buckets. Alternatively, the threshold values are different depending on the color bucket (e.g., the accent type sub-bucket in the yellow color bucket may have a lower threshold value than the accent type sub-bucket in the blue color bucket).

Figure 9:
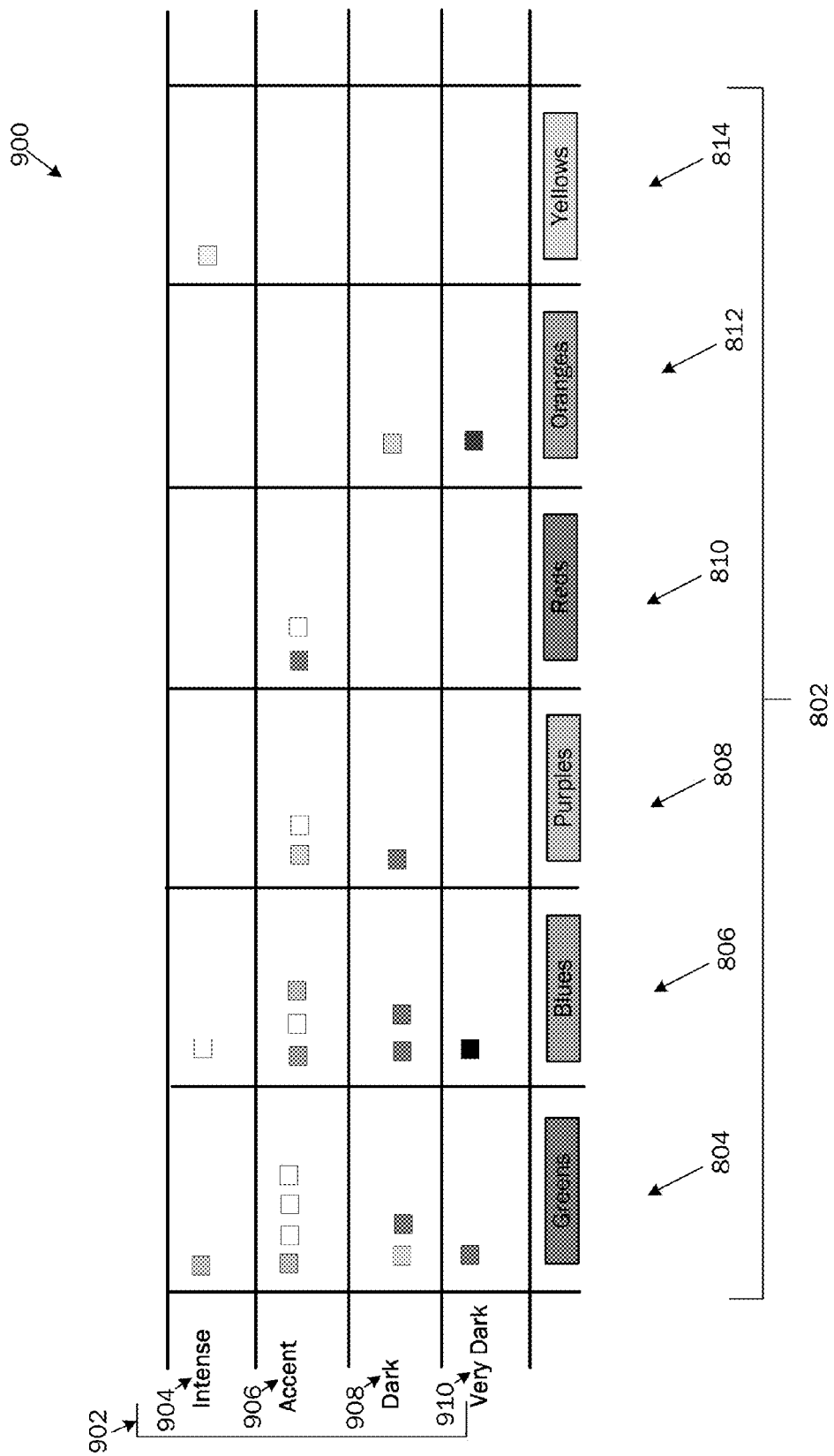
FIG. 9 illustrates an assignment of color values from an image to type sub-buckets performed by aspects of the color extraction engine of FIG. 1.

Referring now to FIG. 9, an illustration 900 of color values from the color buckets 802 being assigned to type sub-buckets 902 is provided. In FIG. 9, the type sub-buckets 902 include intense type sub-buckets 904, accent type sub-buckets 906, dark type sub-buckets 908, and very dark type sub-buckets 910. Other aspects include more, fewer, or additional type sub-buckets. In some aspects, the type sub-buckets 904, 902, 908, and 910 comprise a plurality of type sub-buckets (one type sub-bucket for each color bucket). In some aspects, the type sub-buckets span multiple of the color buckets 802. Also shown in FIG. 9 are a plurality of color values that have been assigned to some of the type sub-buckets 902. These color values have been extracted from an image and assigned to the appropriate color bucket and appropriate type sub-bucket. The illustration 900 is for purposes of illustrating the operation of assigning pixels to type sub-buckets and is typically not actually generated. Instead, one or more data structures (e.g., sets) are used to track at least some of the color values that have been assigned to at least some of the type sub-buckets 902. Additionally, upon completion of operation 706 on a typical image, there would be many more color values in at least some of the type sub-buckets 902.

Returning now to FIG. 7, at operation 708, a type sub-bucket is selected based on a purpose. For example, a color may be needed for accent purposes (e.g., based on a tag in a blueprint). In some aspects, a hue value is specified as well as a purpose. Based on the specified purpose the type sub-bucket associated with the purpose is selected. In some aspects, a table is maintained to associate the type sub-buckets with purposes (e.g., tag values).

At operation 710, a color in the sub-bucket that is similar to a target color for the sub-bucket is selected. In some aspects, each combination of color bucket and type sub-bucket is associated with a target color (e.g., there is a green accent target color and a blue accent target color, etc.). The color values in each of the type sub-buckets 902 may be compared to the target color value to identify the most similar color value. Then the most similar color value is selected. Alternatively, the saturation value of color values within a type sub-bucket that are within a threshold distance from a target color may be compared to each other. Then, the highest saturation color value is selected.

At operation 712, the selected color is incorporated into a suggestion. For example, one or more content elements may be colored to match the selected color.

Figure 10:
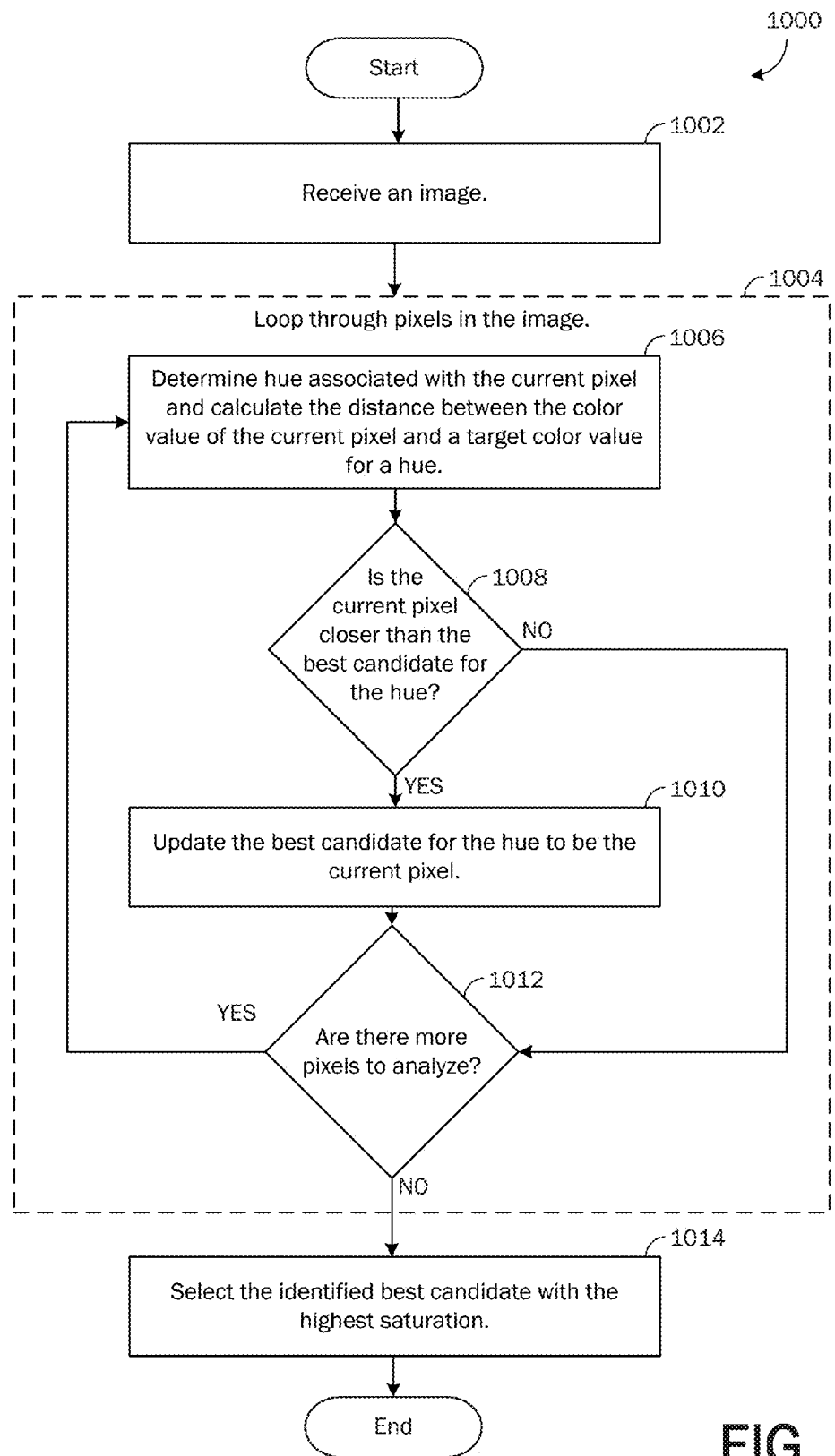
FIG. 10 illustrates a method for extracting a color from an image performed by aspects of the suggestion service of FIG. 1.

FIG. 10 illustrates a method 1000 for extracting a color from an image. As an example, the method 1000 may be executed by a component of a system such as the system 100. For example, the method 1000 may be performed by the color extractor engine 110 to extract colors from an image for use in content elements of a suggestion. In examples, the method 1000 may be executed on a device comprising at least one processor configured to store and execute operations, programs, or instructions.

At operation 1002, an image is received. In some aspects, the image is received from a content region of a content file for which the suggestion service 108 is generating suggestions. In other aspects, the image may be received from an image search application such as a search engine. Additionally, the image may be received from a web crawler application that analyzes web page or social media content.

At loop 1004, the pixels in the image are analyzed. In some aspects, an iteration of the loop is performed on each of the pixels in the image. In other aspects, the image is resized or the pixels in the image are otherwise sampled to decrease the number of iterations that need to be performed. In this manner, the performance of the method 1000 can be increased. For purposes of this description, a pixel that is being analyzed by an iteration of the loop is referred to as the current pixel. For the first iteration of the loop, the current pixel may be set to the first pixel in the image (or resized image) or first sampled pixel.

At operation 1006, a hue is determined for the current pixel and a distance between the color value of the current pixel and a target color value for the determined hue is calculated. The distance may be calculated according to Equation 1 described above or according to a different formula. Additionally, the target color value may be for a hue (e.g., red, blue, green, yellow, etc.) alone or for both a hue and a type (e.g., red accent, intense blue, very dark green, dark yellow, etc.). In some aspects, the color value of the current pixel is compared to the color values of all of the target colors for a specified hue. In some aspects, the color values of the pixels are compared to only some of the target colors for the hue (e.g., those having a same or similar saturation or luminance, etc.).

At operation 1008, the distance between the color value of the current pixel and the target color value for the hue is compared to the distance between the current best candidate for the hue (or the best candidate for the hue and type). In some aspects, if a best candidate has not yet been identified (e.g., during the first iteration of the loop) then the color value of the current pixel is considered to be the best candidate. In some aspects, the distance value associated with the best candidate and the color value of the best candidate are stored in a data structure (e.g., a variable or array) that can be accessed to perform the comparisons. If the current pixel is closer to the target color value than the current best candidate, the method proceeds to operation 1010, where the best candidate for the hue is updated to the color value associated with the current pixel. If not, the method proceeds to operation 1012.

In some aspects, in operation 1008, the color value of the current pixel is also compared to a predetermined list or range of color values that have been identified as being undesirable for use as a design element color. If the color value from the pixel matches any of the undesirable colors or color ranges in the list, the color value will not be identified as the best candidate. Instead, the method proceeds to operation 1012 regardless of how close the current pixel color value is to the target color value.

At operation 1012, it is determined whether there are additional pixels to analyze. If so, the next pixel (e.g., in the image or as selected by the sampling method) is treated as the current image and a new iteration of the loop 1004 begins. If not, the loop 1004 is completed and the method proceeds to operation 1014.

At operation 1014, the identified best candidate with the highest saturation is selected. In some aspects, the best candidates across hues are compared to each other. Once selected, the color value from the selected best candidate can be used for a variety of purposes, such as to update a color value of a content element in a content region.

Figure 11:
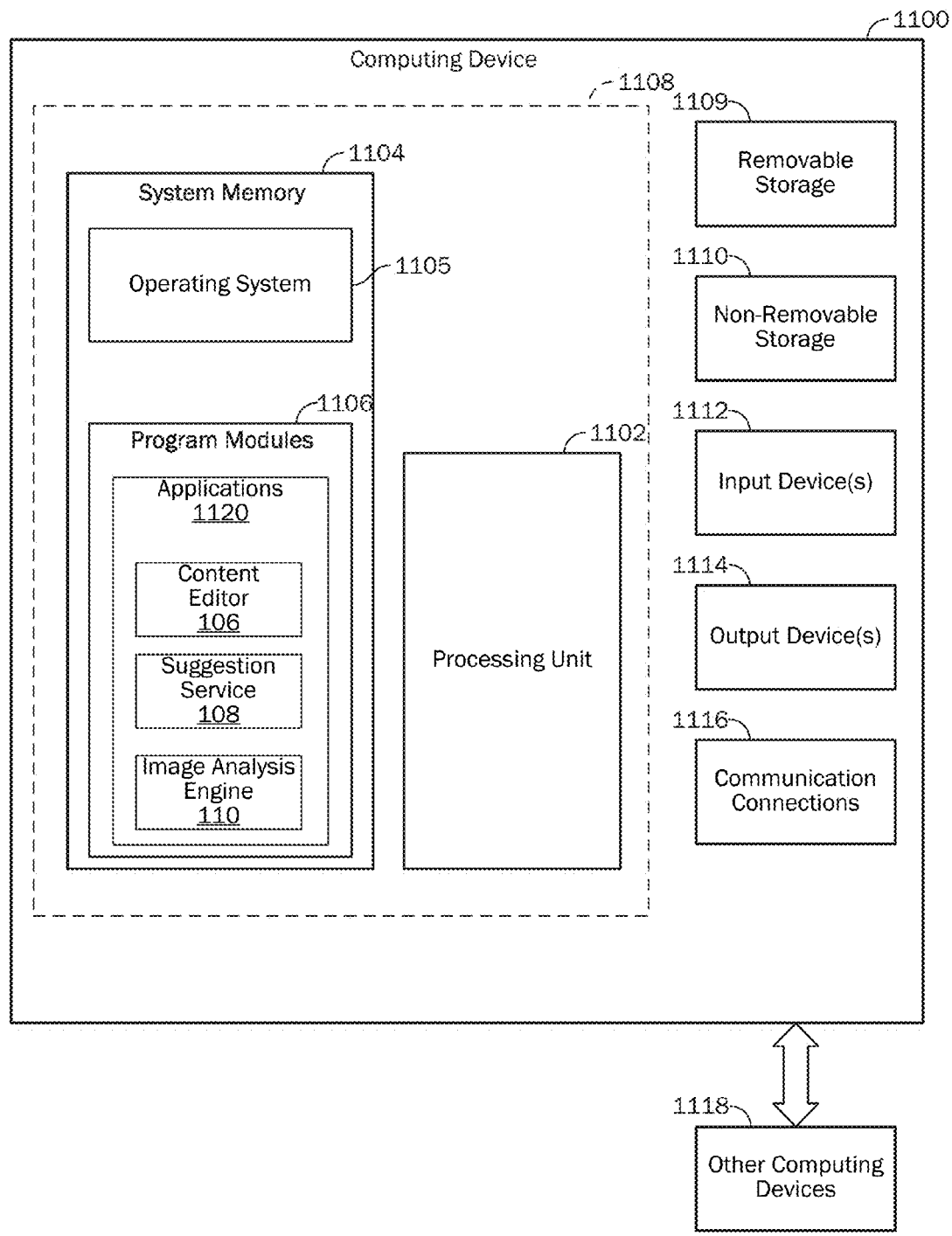
FIG. 11 is a block diagram illustrating example physical components of a computing device with which aspects of the invention may be practiced.
Figure 12A:
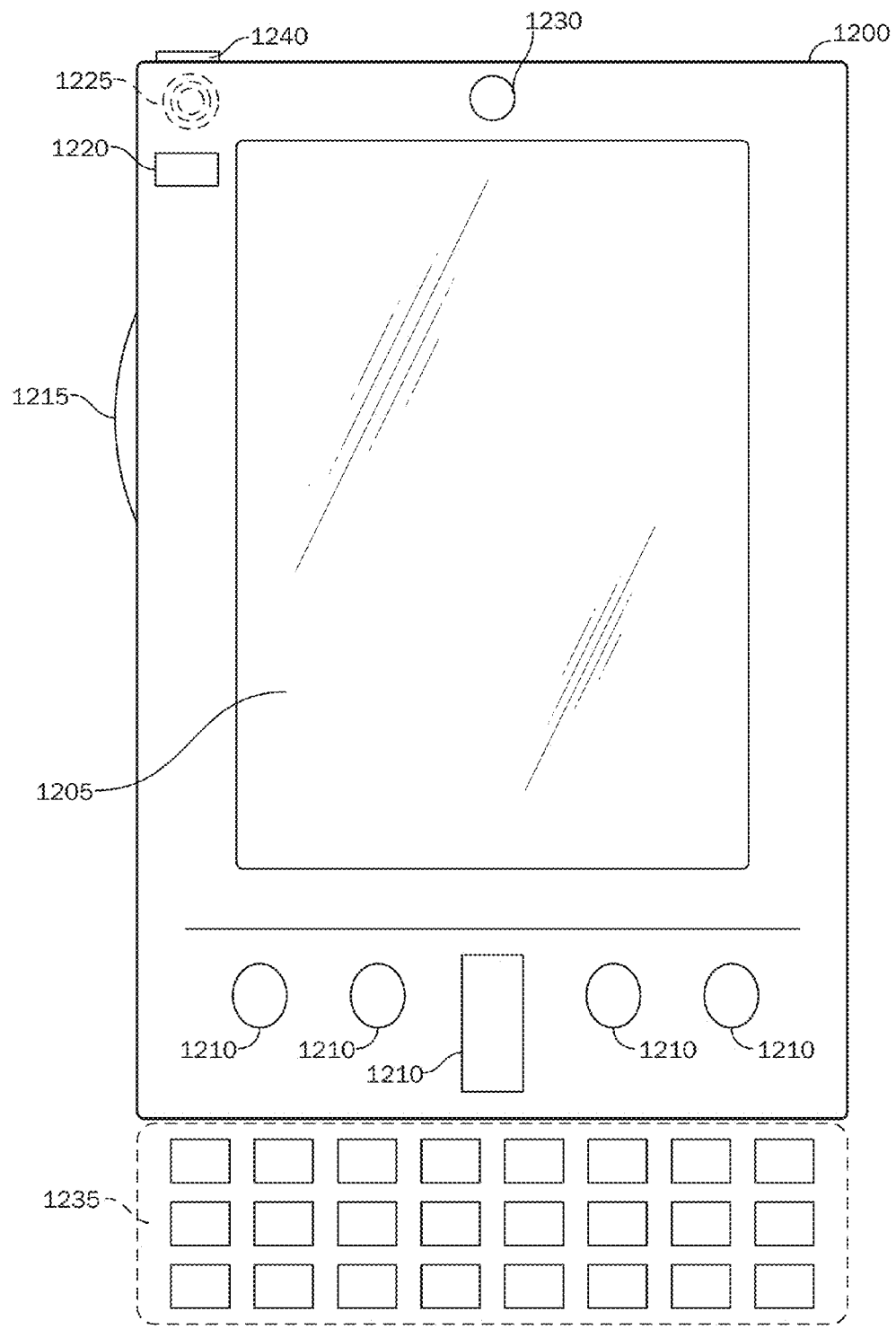
FIGS. 12A and 12B are block diagrams of a mobile computing device with which aspects of the present invention may be practiced.
Figure 12B:
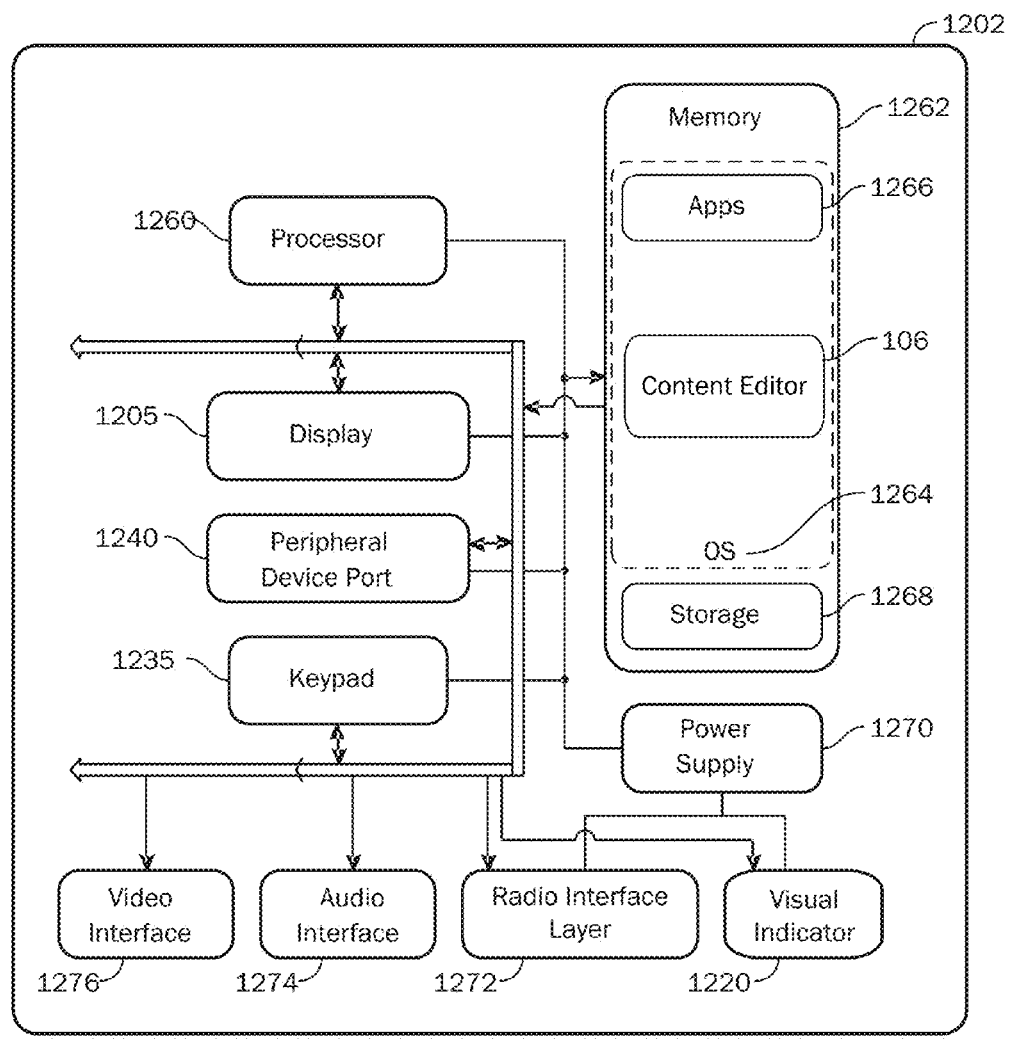
Figure 13:
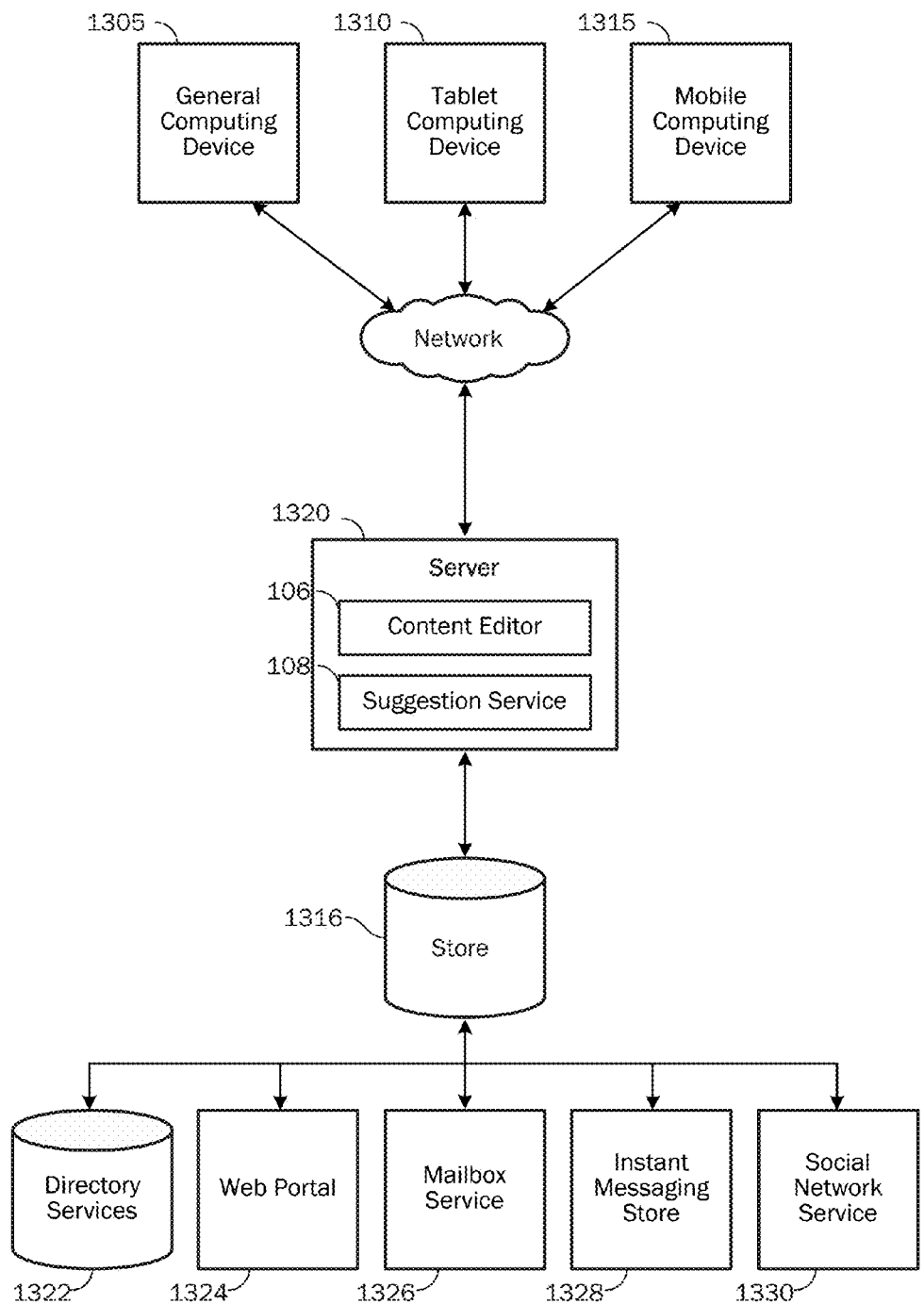
FIG. 13 is a block diagram of a distributed computing system in which aspects of the present invention may be practiced.

FIGS. 11-13 and the associated descriptions provide a discussion of a variety of operating environments in which aspects of the invention may be practiced. However, the devices and systems illustrated and discussed with respect to FIGS. 11-13 are for purposes of example and illustration and are not limiting of a vast number of computing device configurations that may be used for practicing aspects of the invention, described herein.

FIG. 11 is a block diagram illustrating physical components (i.e., hardware) of a computing device 1100 with which aspects of the invention may be practiced. The computing device components described below may be suitable for the user computing device 102 and the server computing device 104. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the content editor 106, the suggestion service 108, and the color extractor engine 110. The operating system 1105, for example, may be suitable for controlling the operation of the computing device 1100. Furthermore, aspects of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., the content editor 106) may perform processes including, but not limited to, one or more of the stages of the methods 300-700 and 1000 illustrated in FIGS. 3-7 and 10. Other program modules that may be used in accordance with aspects of the present invention may include electronic mail and contacts applications, word processing applications, spreadsheet applications, database applications, slide presentation applications, drawing or computer-aided application programs, etc.

Furthermore, aspects of the invention may be practiced in an electrical circuit comprising discrete electronic elements, packaged or integrated electronic chips containing logic gates, a circuit utilizing a microprocessor, or on a single chip containing electronic elements or microprocessors. For example, aspects of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the content editor 106, suggestion service 108, or color extractor engine 110 may be operated via application-specific logic integrated with other components of the computing device 1100 on the single integrated circuit (chip). Aspects of the invention may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A and 12B illustrate a mobile computing device 1200, for example, a mobile telephone, a smart phone, a tablet personal computer, a laptop computer, and the like, with which aspects of the invention may be practiced. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some aspects. In yet another alternative aspect, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output peripheral device ports 1240, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (i.e., an architecture) 1202 to implement some aspects. In one aspect, the system 1202 is implemented as a "smart phone" capable of running one or more applications (e.g., browsers, e-mail applications, calendaring applications, contact managers, messaging clients, games, and media clients/players). In some aspects, the system 1202 is integrated as a computing device, such as an integrated personal digital assistant (PDA) and wireless phone.

The system includes a processor 1260. One or more application programs 1266 may be loaded into the memory 1262 and run on or in association with the operating system 1264 using the processor 1260. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. As should be appreciated, other applications may be loaded into the memory 1262 and run on the mobile computing device 1200, including the content editor 106 described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. The system 1202 may further include a video interface 1276 that enables an operation of an on-board camera 1230 to record still images, video streams, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 illustrates one aspect of the architecture of a system for extracting colors from images, as described above. Content files developed, interacted with, or edited in association with the content editor 106 or suggestion service 108 may be stored in different communication channels or other storage types. For example, various content files may be stored using a directory service 1322, a web portal 1324, a mailbox service 1326, an instant messaging store 1328, or a social networking service 1330. The content editor 106 or suggestion service 108 may access content files using any of these types of systems or the like, as described herein. A server 1320 may provide the content editor 106 or suggestion service 108 to clients. As one example, the server 1320 may be a web server providing the content editor 106 or suggestion service 108 over the web. The server 1320 may provide the content editor 106 or suggestion service 108 over the web to clients through a network. By way of example, the client computing device may be implemented as the computing device 1200 and embodied in a personal computer 1305, a tablet computing device 1310, and/or a mobile computing device 1315 (e.g., a smart phone). Any of these aspects of the client computing device 1305, 1310, 1315 may use the content editor 106 or suggestion service 108 to interact with content files stored in the store 1316.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed invention.

We claim:

1. A system for generating suggestions for arranging content based on matching colors in an image, the system comprising:
    at least one processor; and
    memory, operatively connected to the at least one processor and storing instructions that, when executed by the at least processor, cause the at least one processor to perform a method for generating suggestions for arranging content based on matching colors in an image, the method comprising:
        receiving a content file, the content file including a content region and an image;
        analyzing the image to identify candidate colors in the image;
        analyzing the content file to select a blueprint for the content region, wherein the blueprint comprises an image placeholder, a template design element, and a tag associated with the template design element, the tag indicating an association between the template design element and the image placeholder;
        generating a suggestion for the content region, the suggestion including the image and a suggested design element, the suggested design element matching one of the identified candidate colors, wherein the suggestion is generated based on the blueprint.

2. The system of claim 1, wherein the image includes the image positioned according to the image placeholder and the suggested design element generated based on the template design element.

3. The system of claim 2, wherein the tag further specifies a color type for the template design element and the suggested design element matches one of the identified candidate colors of the specified color type.

4. The system of claim 2, wherein the tag further specifies a hue for the template design element and the suggested design element matches one of the identified candidate colors of the specified hue.

5. The system of claim 1, further comprising identifying a theme based on the identified candidate colors; wherein the generated suggestion uses the identified theme.

6. The system of claim 1, wherein identifying candidate colors in the image comprises:
    comparing a plurality of image colors from the image to a plurality of target colors; and
    identifying a candidate color from the plurality of image colors based on similarity to a target color from the plurality of target colors.

7. The system of claim 6, wherein the target colors comprise at least one target accent color, at least one target intense color, at least one target dark color, and at least one target very dark color.

8. The system of claim 6, wherein comparing a plurality of image colors to a plurality of target colors comprises calculating a distance between an image color from the plurality of image colors and a target color from the plurality of target colors, wherein the distance is based on a difference between a hue of the image color and a hue of the target color, and a difference between a saturation of the image color and a saturation of the target color.

9. The system of claim 8, wherein identifying a candidate color from the plurality of image colors based on similarity to a target color from the plurality of target colors comprises:

comparing the calculated distance between an image color and a target color to a threshold; and when the distance satisfies the threshold, identifying the image color as a candidate color.

10. The system of claim 8, wherein identifying a candidate color from the plurality of image colors based on similarity to a target color from the plurality of target colors comprises:

comparing the calculated distance between an image color and a target color to a threshold; and when the distance satisfies the threshold, identifying the image color as a potential candidate color; and when multiple potential candidate colors are identified, selecting a candidate color from the identified potential candidate colors based on a percentage of the image associated with the potential candidate colors.

11. The system of claim 8, wherein an image color is identified as a candidate color based on determining that the calculated distance value between the image color and a target color is lower than the calculated distance values for any of the other image colors that are compared to a shorter distance from the target color than.

12. The system of claim 1, wherein identifying candidate colors in the image comprises:

sorting the plurality of image colors into hue buckets, wherein each of the hue buckets is associated with a particular hue;

determining saturation values for at least some of the image color values; and identifying at least one candidate color from each of the hue buckets based on a saturation value of the identified image color.

13. A method for generating suggestions for arranging content based on matching colors in an image, the method comprising:

receiving a content file, the content file including a content region and an image, wherein the image comprises a two-dimensional array of pixels and each pixel is associated with a value corresponding to a visual property of the pixel;

comparing color values of the pixels in the two-dimensional array of pixels to target color values, wherein the target color values comprise at least one target accent color and one target dark color;

selecting a dark color value from the color values of the pixels in the two-dimensional array of pixels, the selected dark color value being similar to a target dark color from the at least one target dark color;

selecting an accent color value from the color values of the pixels in the two-dimensional array of pixels, the selected accent color being similar to a target accent color from the at least one target accent color; and generating a suggestion for the content region, the suggestion including the image and a suggested design element, the suggested design element using the selected accent color value, wherein the suggestion for the content region further includes a second suggested design element, the second suggested design element using the selected dark color value.

14. The method of claim 13, further comprising identifying a salient region of the image and wherein the selected accent color is from pixels in the identified salient region.

15. The method of claim 13, wherein the accent color is further selected based on being associated with pixels in proximity to pixels associated with colors that contrast with the accent color.

16. A system for generating suggestions for arranging content based on matching colors in an image, the system comprising:

at least one processor; and memory, operatively connected to the at least one processor and storing instructions that, when executed by the at least processor, cause the at least one processor to perform a method for generating suggestions for arranging content based on matching colors in an image, the method comprising:

receiving a content file, the content file including a content region and an image;

comparing a plurality of image colors from the image to a plurality of target colors, wherein the plurality of target colors comprises a target accent color and a target dark color, the target accent color being different than the target dark color; and identifying candidate colors from the plurality of image colors based on similarity to target colors from the plurality of target colors, the identified candidate colors include a candidate accent color and a candidate dark color, wherein the generated suggestion includes at least one design element that matches the candidate accent color and at least one design element that matches the candidate dark color;

identifying a theme based on the identified candidate colors;

identifying a plurality of blueprints associated with the identified theme;

analyzing the content file to select a blueprint for the content region from the plurality of identified blueprints; and generating a suggestion for the content region based on the selected blueprint, the suggestion including the image and a suggested design element, the suggested design element matching one of the identified candidate colors.

* * * * *